United States Patent
Muchnick et al.

(10) Patent No.: US 10,061,491 B2
(45) Date of Patent: Aug. 28, 2018

(54) SYSTEM AND METHOD FOR PRODUCING EDITED IMAGES USING EMBEDDED PLUG-IN

(71) Applicant: Adobe Sytems Incorporated, San Jose, CA (US)

(72) Inventors: Abraham Moshe Muchnick, Woodmere, NY (US); Israel Derdik, Cedarhurst, NY (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 298 days.

(21) Appl. No.: 14/026,766

(22) Filed: Sep. 13, 2013

(65) Prior Publication Data

US 2014/0071045 A1 Mar. 13, 2014

Related U.S. Application Data

(60) Provisional application No. 61/700,652, filed on Sep. 13, 2012.

(51) Int. Cl.
*G06F 3/0484* (2013.01)
*G06T 11/60* (2006.01)

(52) U.S. Cl.
CPC .......... *G06F 3/04845* (2013.01); *G06T 11/60* (2013.01)

(58) Field of Classification Search
CPC .................................................. G06F 3/04845
See application file for complete search history.

(56) References Cited

U.S. PATENT DOCUMENTS

| | | | |
|---|---|---|---|
| 7,069,314 B1* | 6/2006 | Aoki | G06T 11/60 358/1.2 |
| 7,561,201 B2* | 7/2009 | Hong | H04N 5/23293 348/333.01 |
| 7,586,524 B2* | 9/2009 | Tsue | G11B 27/034 348/231.2 |
| 9,131,078 B2* | 9/2015 | Li | G06Q 20/12 |
| 2002/0067500 A1 | 6/2002 | Yokomizo et al. | |
| 2002/0101440 A1 | 8/2002 | Niikawa et al. | |
| 2002/0135599 A1 | 9/2002 | Yokouchi | |
| 2004/0179740 A1 | 9/2004 | Yasuhiro | |
| 2007/0276728 A1* | 11/2007 | Bala | G06F 21/121 705/14.54 |
| 2008/0209311 A1* | 8/2008 | Agronik | G06T 11/60 715/234 |
| 2009/0070675 A1* | 3/2009 | Li | G06Q 20/12 715/716 |
| 2011/0097011 A1 | 4/2011 | Lim et al. | |
| 2012/0210217 A1* | 8/2012 | Abbas et al. | 715/716 |

(Continued)

*Primary Examiner* — Afroza Chowdhury
(74) *Attorney, Agent, or Firm* — Wolfe-SBMC

(57) ABSTRACT

Disclosed is a cross-platform image editor configured with image editing tools and that is integrated with a software application and operable on a user computing device. A low-res version of a high-res image stored in an image library is displayed, and a user selection of at least one image editing tool and at least one associated parameter is received. The low-res version is modified accordingly. Without human user intervention the high resolution image is processed by executing at least one instruction respectively associated with each of the at least one selected image editing tools using the at least one parameter. The modified high resolution image is output.

24 Claims, 28 Drawing Sheets

IMAGE EDITOR SLIDES INTO VIEW

IMAGE IS BEING EDITED

(56) References Cited

U.S. PATENT DOCUMENTS

2013/0085811 A1\* 4/2013 Darden ................. 705/7.38
2013/0120439 A1\* 5/2013 Harris ................. G11B 27/034
                                                                        345/619
2013/0132455 A1\* 5/2013 Mangini et al. ............ 709/201

\* cited by examiner

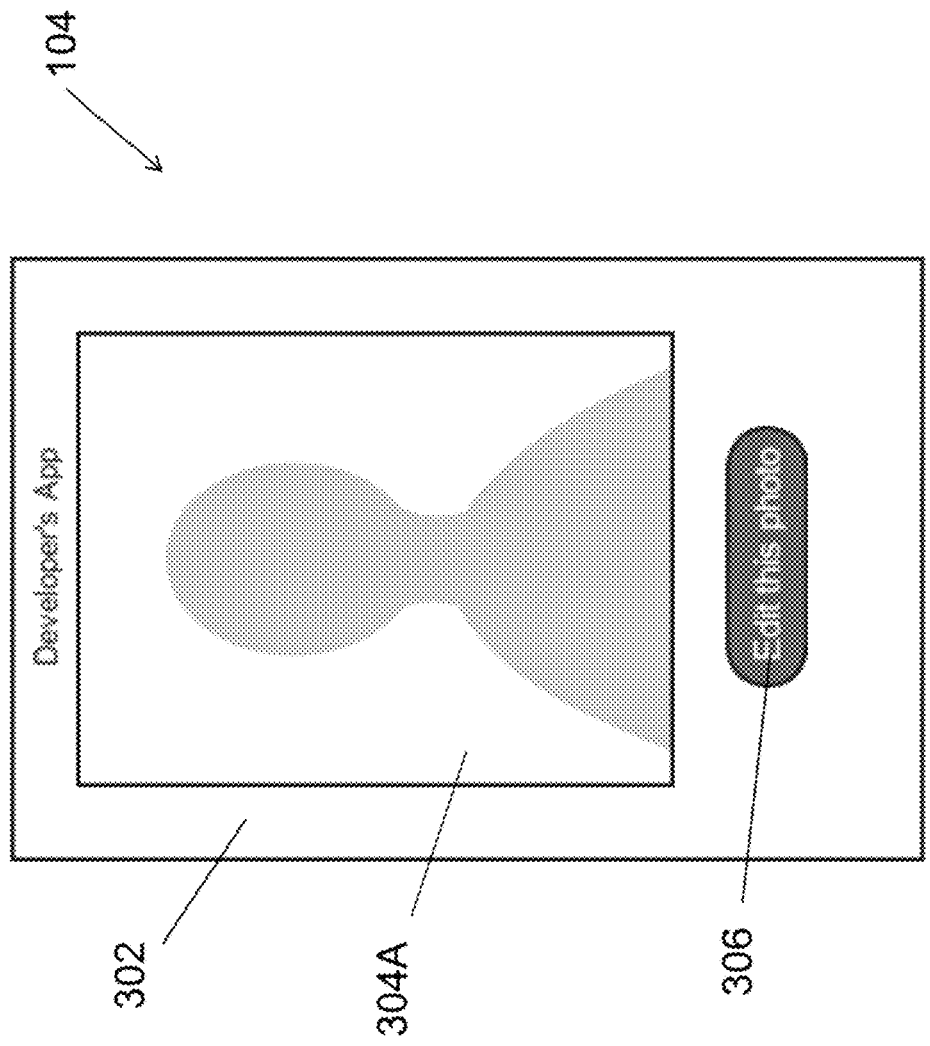

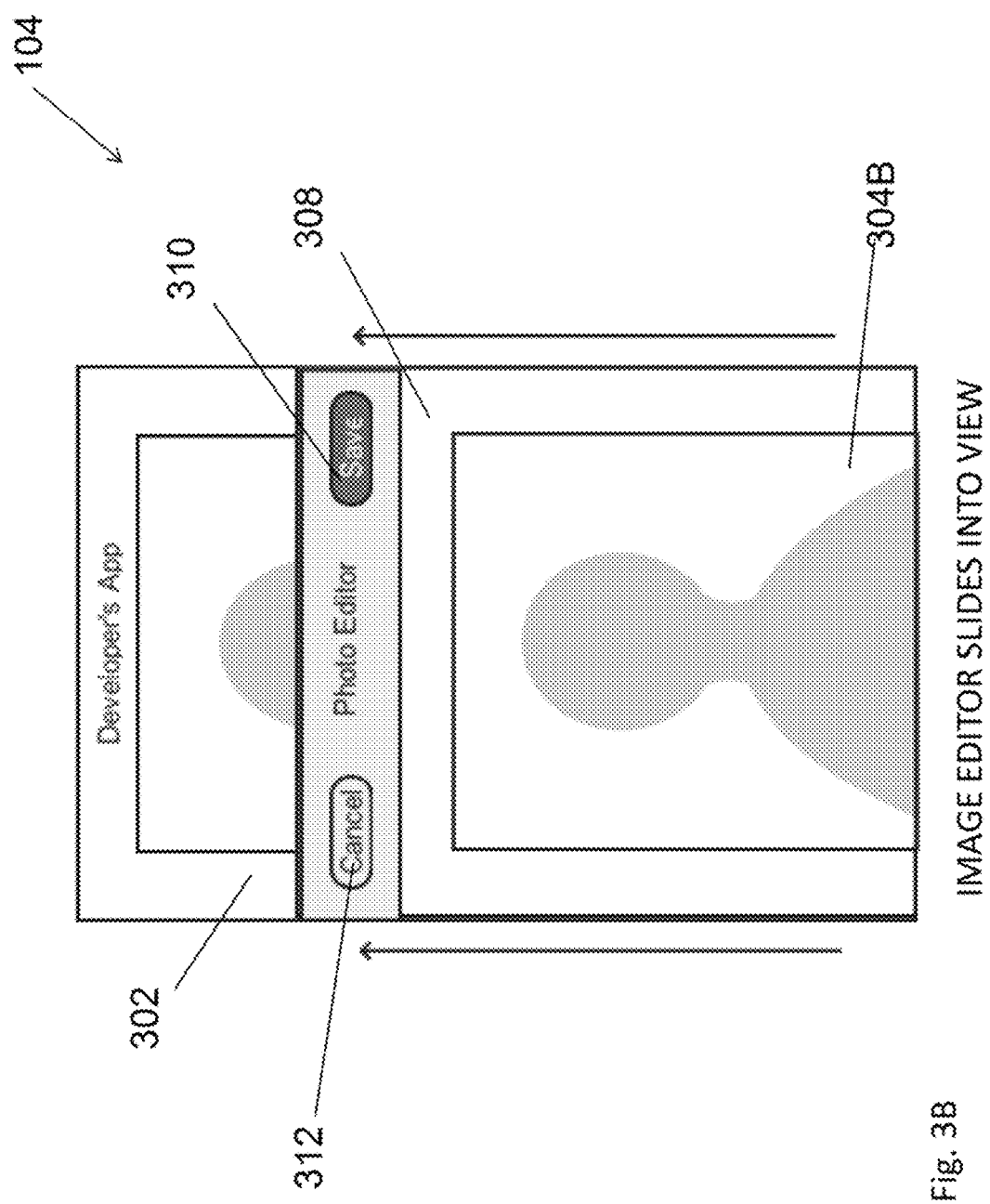

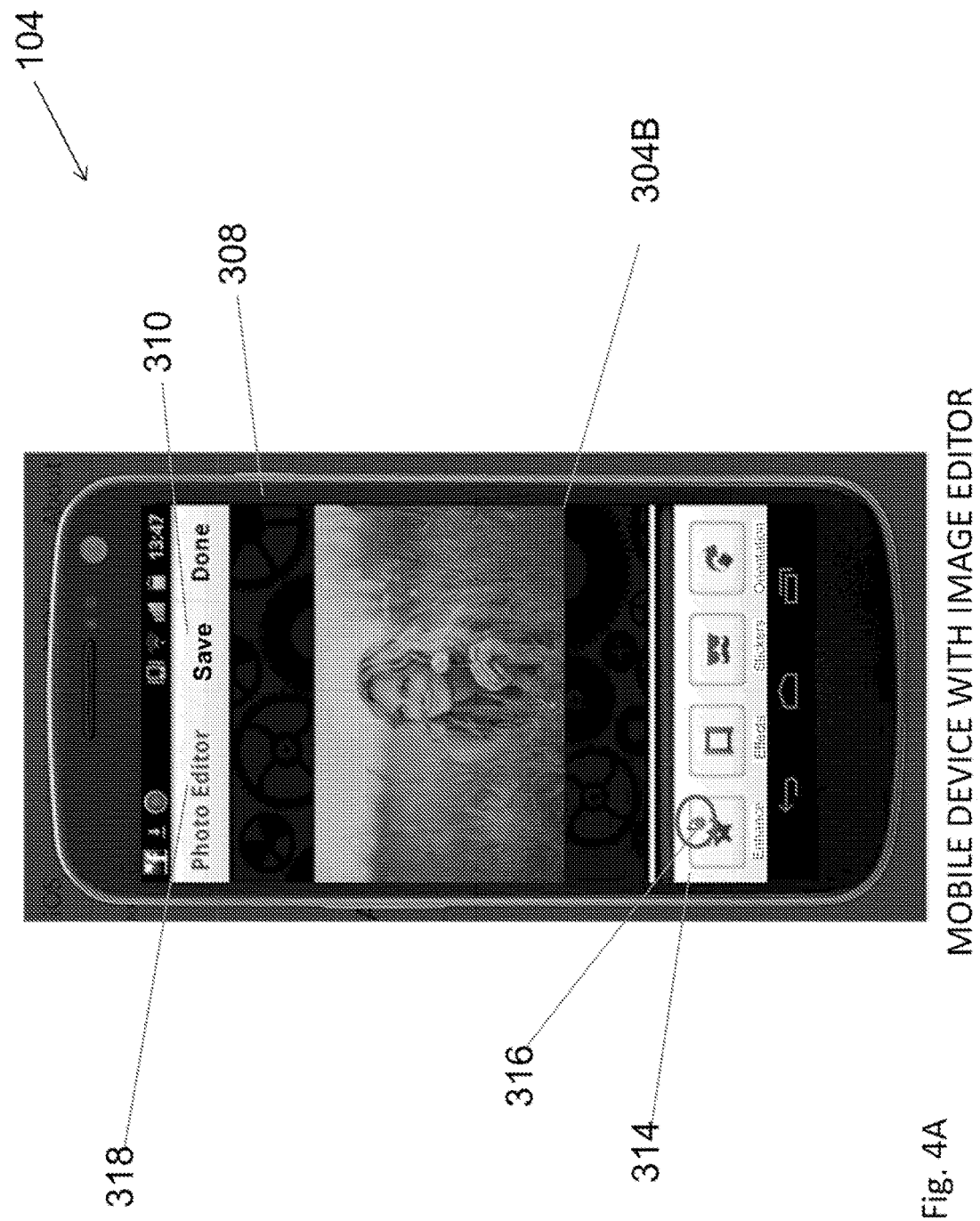

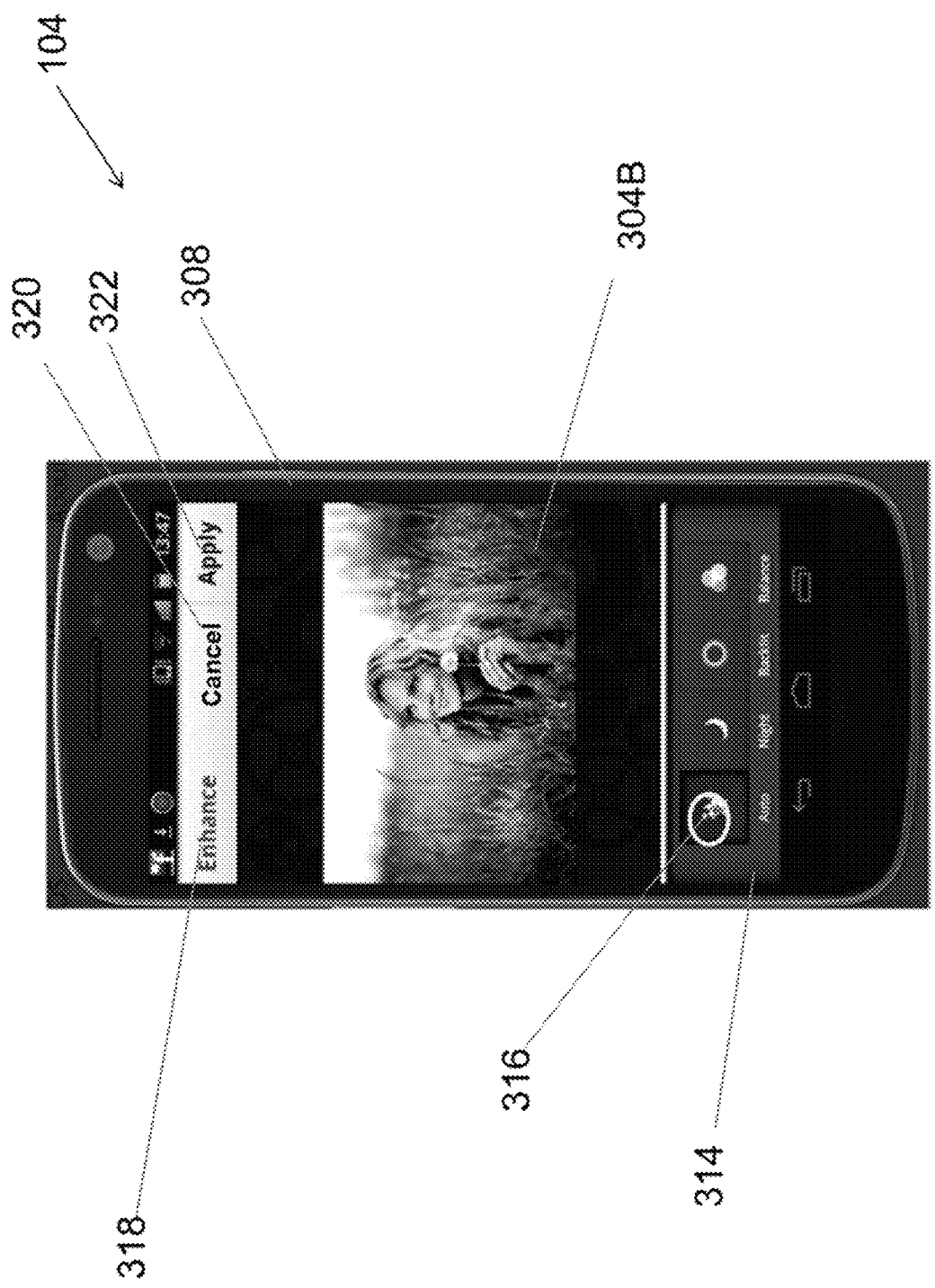

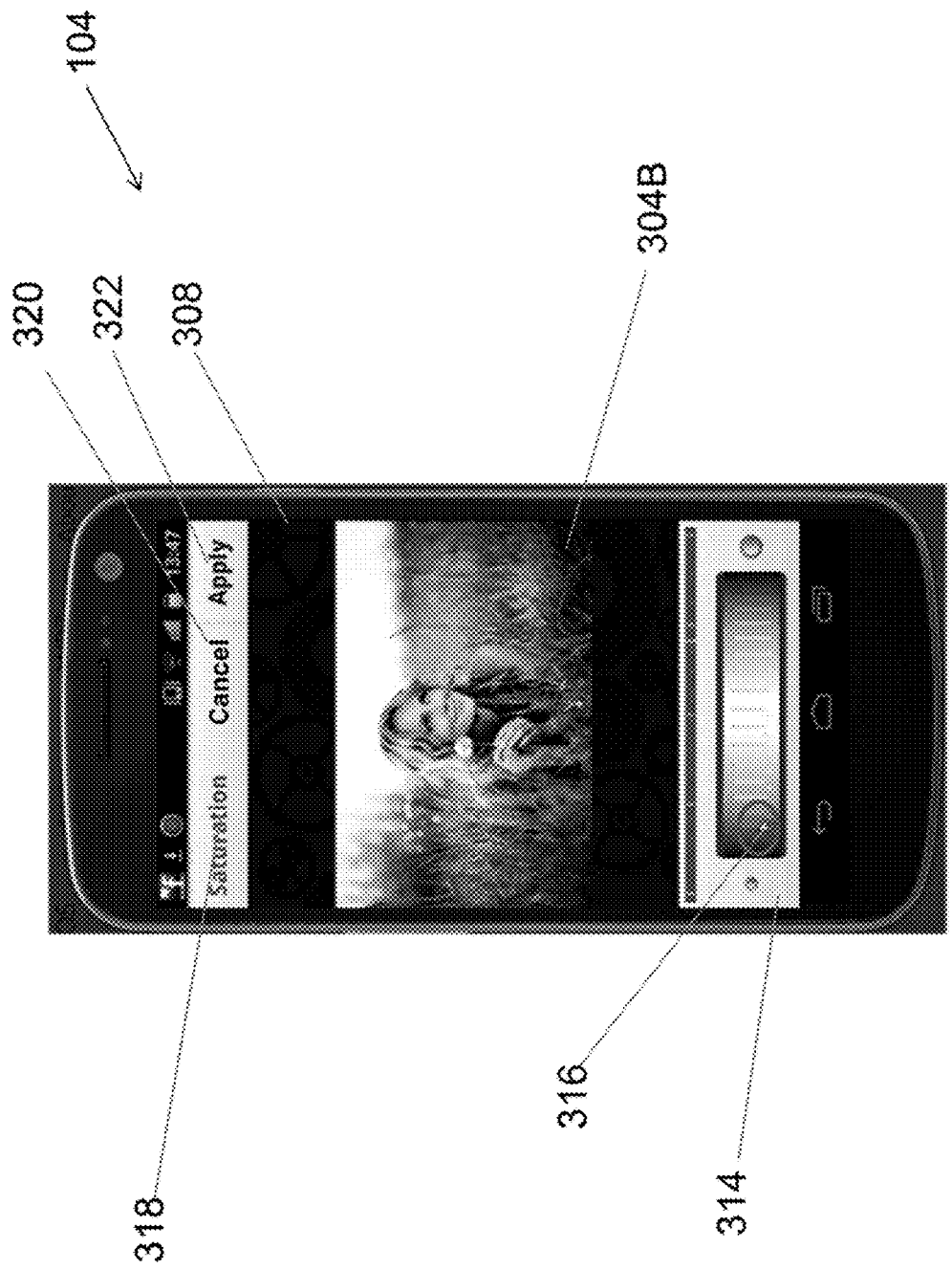
Fig. 4D  SATURATION FUNCTIONALITY

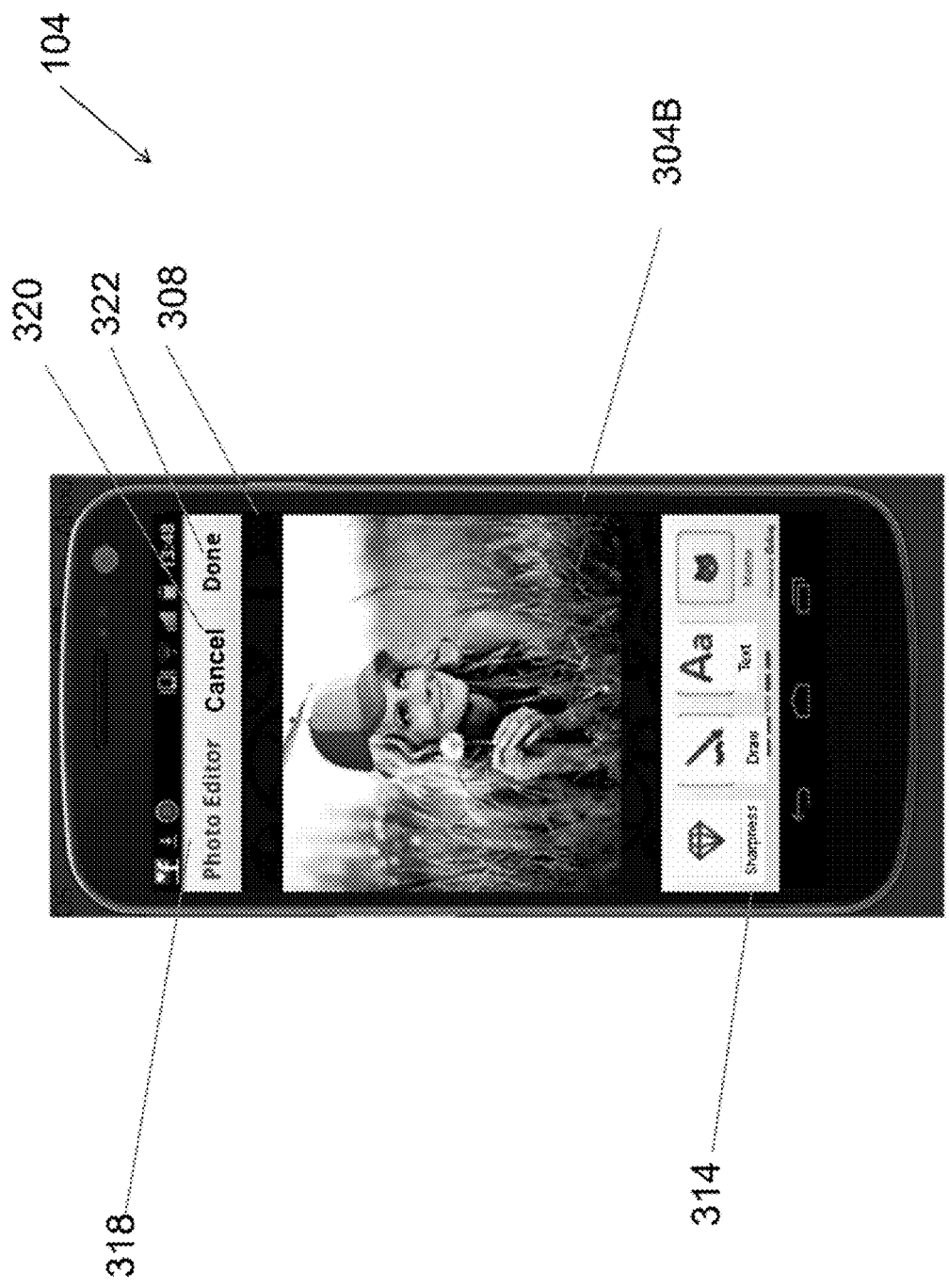
Fig. 4F  SHARPNESS, DRAWING, TEXT, MEME OPTIONS

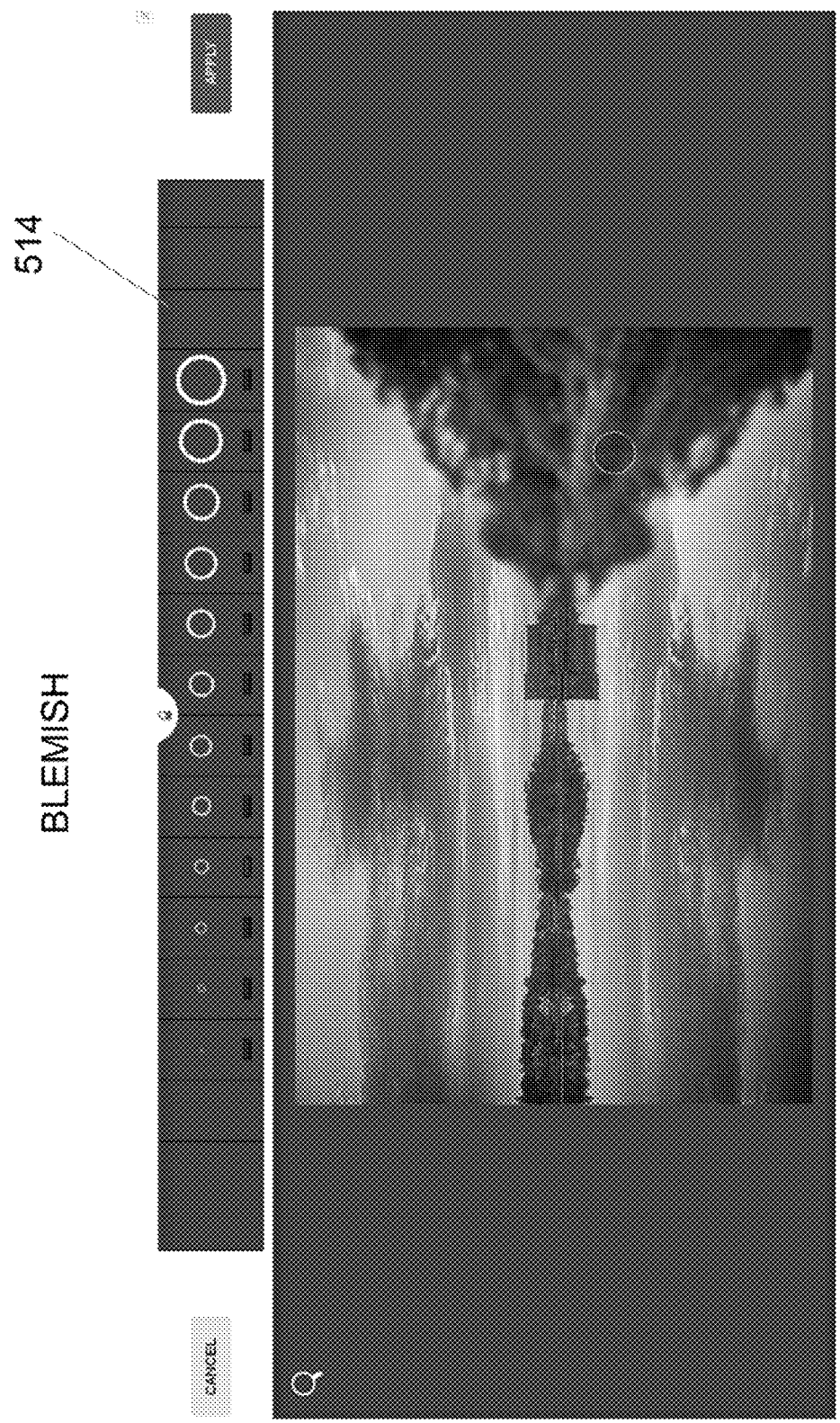

SYSTEM AND METHOD FOR PRODUCING EDITED IMAGES USING EMBEDDED PLUG-IN

CROSS-REFERENCE TO RELATED APPLICATIONS

This application relates to and claims priority to U.S. provisional patent application Ser. 61/700,652, filed Sep. 13, 2012, which is incorporated herein by reference in its entirety.

FIELD

The present application relates, generally, to communications and, more particularly, to multimedia editing.

BACKGROUND

The proliferation of digital multimedia content, including images, over the Internet, has fueled tremendous desire for manipulation of the content. One reason may be to allow for individual expression associated with images. Unfortunately, the current state of the image editing experience for many users, particularly with regard to sophisticated editing, is not satisfactory. One reason is due to excessive pricing associated with powerful image editing software applications. Another reason is due to the steep learning curve that users experience when attempting to customize a digital image. The most important reason is the number of disjointed steps involved in customizing a digital image, often involving downloading an image, customizing it one software app, then uploading it to its final destination. The result of these and other barriers is that users are frustrated and give up.

Many Internet web sites provide access to image content and enable users to upload images they created (e.g., taken from digital cameras). Relatively recently, content from such web sites is now available on mobile computing device. Moreover, smartphones are configured with cameras that operate to take relatively high-resolution images. Editing such images is either unavailable, too limiting, or simply too frustrating.

SUMMARY

The present application addresses these and other concerns and shortcomings with regard to providing interactive systems and methods for multimedia content.

In accordance with one or more implementations, a system and method are disclosed that include a cross-platform image editor that is integrated with a software application and that is configured with image editing tools. A low resolution version of a high resolution image stored in an image library is loaded and displayed in a cross-platform image editor that is operating on a user computing device. A user selection of at least one of the respective image editing tools configured with the cross-platform image editor, and at least one parameter associated with the at least one tool, is received. Furthermore, the low resolution version of the image is processed to be modified, with the user computing device, by executing at least one instruction respectively associated with each of the at least one selected image editing tools using the at least one parameter. The low resolution version of the image as modified in view of the user selection is displayed. Moreover, the high resolution image is loaded, without human user intervention, in the cross-platform image editor that is operating on the user computing device or in an image editor operating on a second computing device. Furthermore, the high resolution image is processed with the user computing device or the second computing device to be modified by executing at least one instruction respectively associated with each of the at least one selected image editing tools using the at least one parameter. Moreover, the modified high resolution image is output, with the user computing device or the second computing device.

In accordance with one or more implementations, the system and method further include identifying, without human user intervention and with the user computing device or the second computing device, at least one other high resolution image in the image library. The system and method may further include displaying, with the user computing device, a respective low resolution version of each of the at least one other high resolution image, and displaying, with the user computing device, at least one prompt to modify at least one of the respective low resolution version of each of the at least one other high resolution image using the at least one parameter. Furthermore, the system and method may include processing, with the user computing device or the second computing device, and in response to a user reply to the at least one prompt, to modify at least one of the at least one other high resolution image.

In one or more implementations, a system and method are provided for integrating image-editing functionality in a software application. An image editor is provided that is configured to be integrated within each of a plurality of respective software applications that operate in respective computing environments. A plurality of software development tools are provided that respectively add, remove and/or modify image editing functionality provided by the image editor when the image editor is integrated with at least one of the respective software applications. A request is received for the image editor and the plurality of software development tools, which is processed, and the image editor and at least some of the software development tools are transmitted.

Additional or other features and advantages of the present application will become apparent from the following description of the invention that refers to the accompanying drawings.

BRIEF DESCRIPTION OF THE DRAWINGS

FIGS. 3A-3D illustrate example screen displays of an implementation of the present application;

FIGS. 4A-4G illustrate example screen displays provided on a mobile computing device and accordance with an example implementation of the present application;

FIGS. 5A-5G illustrate example functionality associated with one or more implementations of the present application;

DETAILED DESCRIPTION

Figure 1:
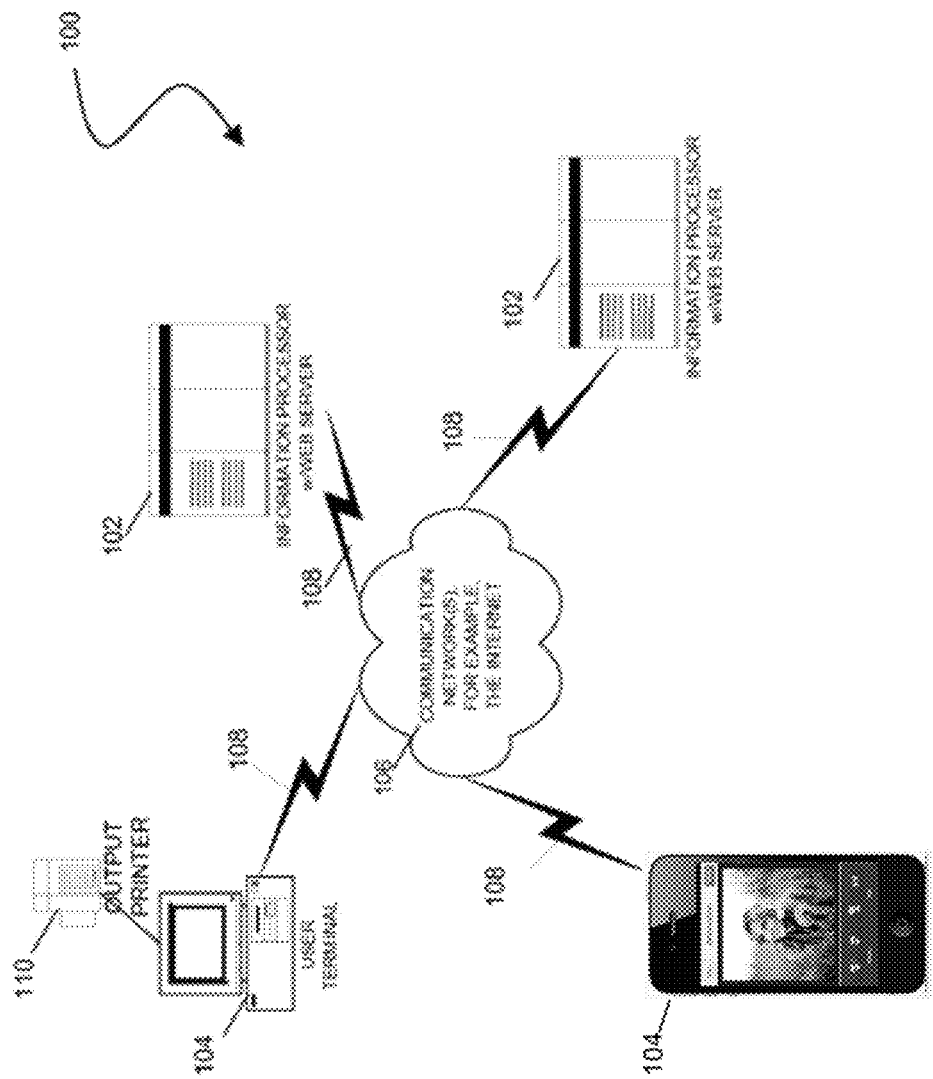
FIG. 1 shows an example hardware arrangement for viewing, reviewing and outputting content in accordance with an implementation.

The present application relates to image/image-editing functionality that is made available within a wide variety of third-party software applications and web sites. In one or more embodiments, users of such software and web sites may use the teachings herein to edit images, such as to add creative filters to images, to add specialized borders to images, to overlay "stickers," to add creative fonts or the like for customized image editing. In one or more implementations, functionality is provided for users to develop mobile apps and/or web sites that include or otherwise integrate sophisticated functionality shown and described herein. Thus, in addition to providing a user interface for image editing, the present application provides a development platform for integrating a sophisticated image editor into a software application and/or web site. Unlike known systems that may provide image-editing functionality in complex, large "stand-alone" applications, the present application enables seamless integration of sophisticated image editing technology with virtually any existing software application. The image editor may be provided with one or more software development tools for adding, removing and/or customizing functionality.

In one or more embodiments, third-party software applications are supported that operate on-line, substantially in real-time over a communication network. For example, the present application integrates image editing functionality, such as shown and described in greater detail herein, directly within an application that may operate on a mobile computing device or in an Internet website (which may be configured for a mobile computing device platform). For example, an image editor is provided that may include options for manipulating various image settings, and that may be integrated into virtually any software program application, including for mobile computing devices. In this way, the present application provides a ubiquitous technology solution that may be provided in remote software systems. Moreover, the image editor of the present application is configured to provide cross-platform functionality, and provides editing options for desktop and mobile computing devices that employ a variety of operating systems.

In one or more implementations, the application includes a software development kit ("SDK") that is usable for software developers to integrate image-editing functionality in various software systems. Software developers, which may include web developers, mobile device software application developers or the like, may download a respective SDK and integrate functionality, such as shown and described herein, via an application programming interface ("API") provided as a function of the SDK. Optional features may further be provided to enable software developers to customize the appearance and operations of various features set forth herein. In this way, the present application provides a seamless integration of functionality associated with image editing technology with functionality set forth in the software developers' host environments. Such integration provides a new convenient, fast and intuitive solution is provided for customizing multimedia content. Moreover, image-editing functionality may be provided without a need for a connection to one or more computers (e.g., server computers).

In an embodiment, an API provided in accordance with the teachings herein may be used to enable users to increase and/or reduce or remove styles, such as textures, shadows, rounded corners, and gradients, which may be preconfigured in the SDK. Other styles that may be desired by users may be added using various key/value pairs supported by the respective SDK. For example, options may be added for autocorrecting an image with one or more selective enhancements, for choosing from a variety of effects and filters, for selecting a variety of virtual "stickers" that may be placed, resized and/or edited on an image. As shown and described herein, other options include choices for rotating an image, resiting an image, cropping an image, sharpening, adjusting brightness, contrast, saturation, white balance, removing redeye, blemishing, blemish removal, red-eye removal, whitening, free drawing and adding/editing text. The order of one or more tools may further be customized. The SDK may further support various other custom settings, such as defining a maximum size of a canvas for editing an image, defining a screen position for the image editor, defining a maximum image size for editing, and for defining which specific tool opens initially when the image editor runs. Moreover, the present application supports temporarily darkening a web page (or other workspace) until the user completes an image editing process.

As noted herein, the image editor provided in accordance with the teachings herein may be integrated within an Internet web site and is preferably optimized for various and current versions of web browser software applications, such as CHROME, FIREFOX, SAFARI, and INTERNET EXPLORER, to name a few. Moreover, the present application supports mobile browsers, and functions on handheld touch-screen devices, including tablet computing devices, smartphones, personal digital assistants or the like. For handheld use, one or more SDKs associated with the present application may provide a user interface that is optimized for the respective size and layout of respective smaller displays, and that includes "native" performance associated with one or more mobile devices.

In an example implementation, the SDK allows users to develop one or more software applications (including mobile applications, desktop applications or other software applications) and/or Internet web sites in which users may edit images without a need to exit or leave the focus of the developed software application. This is provided via an editing interface that may dynamically appear and disappear, for example such as by sliding in and out of view, as a software application user interfaces with image(s) in the software application. Further, after a user completes one or more editing tasks, the user may return to the "native" workflow of the software application and the image (as edited) may be passed back to the software application for further viewing, processing and/or saving.

In an embodiment, a history of actions taken by a user who edits an image in accordance with an implementation of the present application may be created and/or maintained. For example, keystrokes, mouse-clicks, selections and/or commands received from a user may be "recorded" or otherwise captured and saved for future use. For example, one or more fees may be respectively charged to a user who uses one or more respective functional features. Alternatively, one or more actions taken by a user during the editing of a respective image may be repeated automatically based on the archived record. In this way, after a user makes potentially complex edits to an image, the same edits can, thereafter, be applied to one or more other images. In addition, the present application may include a server-side solution, which may be separate from a mobile computing device application and that receives and replays steps provided in the archived record on a version of the image that was edited by the user. For example, the archived record version may have a significantly higher resolution (e.g., tens of millions of bytes larger) than the version of the image that was edited by the user. This is a useful feature for lower-resolution images that are edited by a user relatively quickly in an on-line or mobile computing device environment and, and the respective edit steps are recreated on a significantly higher resolution and larger version of the image that would not be otherwise suitable for on-line or mobile-device editing (such as due to its large size).

In an alternative embodiment (or in addition), the present application supports processing high-resolution images directly on a mobile device. For example, a user interacts with a low-resolution (e.g., thumbnail) version of an image and the user's actions are replayed on a high-resolution version of the image that is also accessible (e.g., stored on or loaded) on the mobile computing device. In this implementation, rather than passing the archived record to a remote computer, such as a third party server, a new processing thread may be spawned on the mobile computing device and the high-resolution image may be modified thereon. This enables complex modifications to be made to an image on a mobile computing device quickly and conveniently, since the version of the image that the user interacts with is relatively small. Editing revisions made by the user to the image appear to the user instantaneously and without any processing lag that is often experienced in connection with large images. By referencing the archived record, the large resolution version of the image is modified without interrupting the user's workflow experience.

Thus, in one or more implementations, a user-edited version of an image (e.g., a relatively low resolution version of the image) may be displayed in a mobile device software application, and user editing actions are received and recorded, and the actions may be repeated for the higher resolution version. This feature saves computing resources and time for transferring massively large-sized files back and forth between various servers and/or devices. Moreover, this feature is useful for high-resolution images, and that may be stored off the mobile device (e.g., taken with a digital SLR camera and stored in a third party service like FLICKR, FACEBOOK, INSTAGRAM, TWITTER, TUMBLR, DROPBOX, PHOTOBUCKET, SHUTTERFLY or SNAPFISH), and/or prepared for an external purpose off the mobile device (i.e. for print). Moreover, functionality may be provided for publishing an image that is edited in accordance with the present application to one or more social network web sites, such as listed above. Options may be provided, for example, to share images to one or more social network web sites via a (single-click) graphical screen control or menu choice.

In addition, the present application provides for various revenue sharing options that may include partnering with developers and distributors to sell image editing options, upgrades and/or features as in-application purchases. For example, end-users may be provided with options to purchase image filter packs, stickers, fonts, or other editing optional features, and use the options as part of the image editing experience within a respective developer's software application. Revenue from such purchases may be shared between a plurality of parties according to pre-negotiated agreements. For example, providers of the features, application developers, web site hosts, advertisers or the like may share in revenue earned from the sale of options, upgrades and/or features.

In one or more implementations, creative content (e.g., filter packs, stickers, fonts or the like) may be deployed dynamically such that providers of such content can release the content without a need for an update to an application. For example, a content "store," such as a sticker store, a font store, a color store, or the like, may be made available via a respective SDK. Creative content may be provided at varying prices, such as for premium content that may boost users' photo-editing options through the purchase of a wide variety of high-quality stickers, effects, frames, or the like. Moreover, the present application supports advertising campaigns, wherein content is listed for free for end-users, and paid for as a function of one or more brand advertisements provided with the content.

In one or more implementations of the present application may provide for various pricing and/or rate structures that may be associated with images of varying resolutions. For example, images of a resolution within a certain range (e.g., up to 800 pixels×800 pixels) and that may be well-suited for web sites, may be provided at no or low cost, while higher resolution images may be provided for a fee. In one or more implementations, the fees associated with editing large-sized images may be passed to the host or application distributor. In such cases, a "premium" image editor may be distributed that has very few restrictions with regard to the size of the edited image, but that has a price associated with including it in an application or that costs users a fee to use. Such editors may be provided for use in an "off-line" context, such as in an Internet web browser that is off-line, such that a large resolution file may be edited. Large resolution files, such as set forth in an image taken by a high-resolution camera, typically impacts output performance, and may not be suitable for on-line editing.

Referring now to the drawings figures in which like reference numerals refer to like elements, there is shown in FIG. 1 a diagram of an example hardware arrangement that operates for providing the systems and methods disclosed herein, and designated generally as system 100. System 100 is preferably comprised of one or more information processors 102 coupled to one or more user computing devices 104 across communication network 106. User computing devices may include, for example, mobile computing devices such as tablet computing devices, smartphones, personal digital assistants or the like. Further, printed output is provided, for example, via output printers 110.

Information processor 102 preferably includes all necessary databases for the present invention, including image files, metadata and other information relating to artwork, artists, and galleries. However, it is contemplated that information processor 102 can access any required databases via communication network 106 or any other communication network to which information processor 102 has access. Information processor 102 can communicate devices comprising databases using any known communication method, including a direct serial, parallel, USB interface, or via a local or wide area network.

User computing devices 104 communicate with information processors 102 using data connections 108, which are respectively coupled to communication network 106. Communication network 106 can be any communication network, but is typically the Internet or some other global computer network. Data connections 108 can be any known arrangement for accessing communication network 106, such as dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers to display the received data on display devices incorporated therewith. By way of example, user computing device 104 may be personal computers such as Intel Pentium-class computers, but are not limited to such computers. Other workstations which can communicate over a global computer network such as smartphones, tablet computers, personal digital assistants (PDAs) and mass-marketed Internet access devices such as WebTV can be used. In addition, the hardware arrangement of the present invention is not limited to devices that are physically wired to communication network 106. Of course, one skilled in the art will recognize that wireless devices can communicate with information processors 102 using wireless data communication connections (e.g., WIFI).

According to an embodiment of the present application, user computing device 104 provides user access to information processor 102 for the purpose of receiving and providing art-related information. The specific functionality provided by system 100, and in particular information processors 102, is described in detail below.

System 100 preferably includes software that provides functionality described in greater detail herein, and preferably resides on one or more information processors 102 and/or user computing devices 104. One of the functions performed by information processor 102 is that of operating as a web server and/or a web site host. Information processors 102 typically communicate with communication network 106 across a permanent i.e. unswitched data connection 108. Permanent connectivity ensures that access to information processors 102 is always available.

Figure 2:
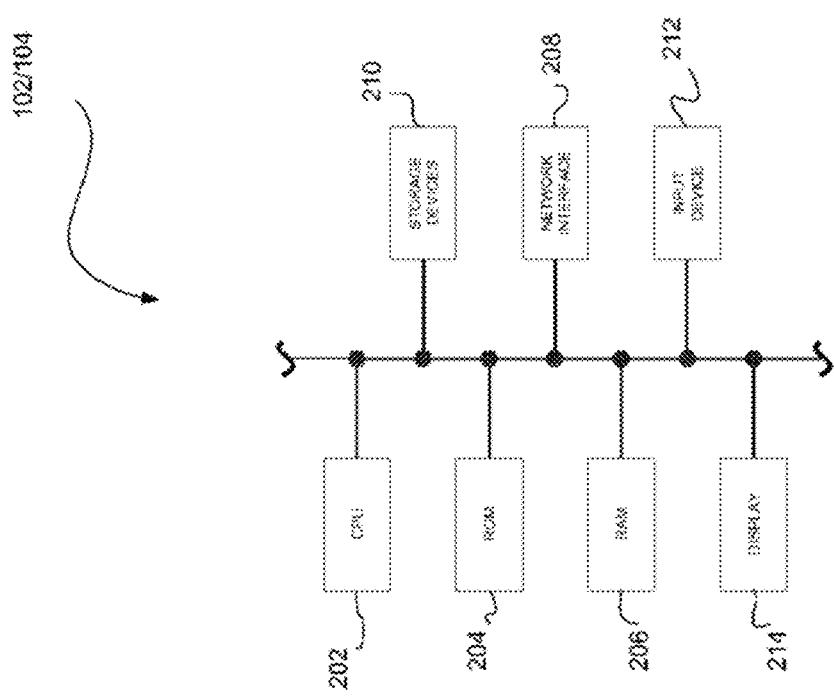
FIG. 2 is a block diagram that illustrates functional elements of a computing device in accordance with an embodiment.

As shown in FIG. 2 the functional elements of each information processor 102 or workstation 104, and preferably include one or more central processing units (CPU) 202 used to execute software code in order to control the operation of information processor 102, read only memory (ROM) 204, random access memory (RAM) 206, one or more network interfaces 208 to transmit and receive data to and from other computing devices across a communication network, storage devices 210 such as a hard disk drive, floppy disk drive, tape drive, CD-ROM or DVD drive for storing program code, databases and application code, one or more input devices 212 such as a keyboard, mouse, track ball and the like, and a display 214.

The various components of information processor 102 need not be physically contained within the same chassis or even located in a single location. For example, as explained above with respect to databases which can reside on storage device 210, storage device 210 may be located at a site which is remote from the remaining elements of information processors 102, and may even be connected to CPU 202 across communication network 106 via network interface 208.

The functional elements shown in FIG. 2 (designated by reference numbers 202-214) are preferably the same categories of functional elements preferably present in user computing device 104. However, not all elements need be present, for example, storage devices in the case of PDAs, and the capacities of the various elements are arranged to accommodate expected user demand. For example, CPU 202 in user computing device 104 may be of a smaller capacity than CPU 202 as present in information processor 102. Similarly, it is likely that information processor 102 will include storage devices 210 of a much higher capacity than storage devices 210 present in workstation 104. Of course, one of ordinary skill in the art will understand that the capacities of the functional elements can be adjusted as needed.

The nature of the present application is such that one skilled in the art of writing computer executed code (software) can implement the described functions using one or more or a combination of a popular computer programming language including but not limited to C++, VISUAL BASIC, JAVA, ACTIVEX, HTML 5, XML, ASP, SOAP, OBJECTIVE C, and C# and various web application development environments.

As used herein, references to displaying data on user computing device 104 refer to the process of communicating data to the workstation across communication network 106 and processing the data such that the data can be viewed on the user computing device 104 display 214 using a web browser or the like. The display screens on user computing device 104 present areas within control allocation system 100 such that a user can proceed from area to area within the control allocation system 100 by selecting a desired link. Therefore, each user's experience with control allocation system 100 will be based on the order with which (s)he progresses through the display screens. In other words, because the system is not completely hierarchical in its arrangement of display screens, users can proceed from area to area without the need to "backtrack" through a series of display screens. For that reason and unless stated otherwise, the following discussion is not intended to represent any sequential operation steps, but rather the discussion of the components of control allocation system 100.

Although the present application is described by way of example herein in terms of a web-based system using web browsers and a web site server (information processor 102), and with mobile computing devices (104) system 100 is not limited to that particular configuration. It is contemplated that control allocation system 100 can be arranged such that user computing device 104 can communicate with, and display data received from, information processor 102 using any known communication and display method, for example, using a non-Internet browser Windows viewer coupled with a local area network protocol such as the Internetwork Packet Exchange (IPX). It is further contemplated that any suitable operating system can be used on user computing device 104, for example, WINDOWS 3.X, WINDOWS 95, WINDOWS 98, WINDOWS2000, WINDOWS CE, WINDOWS NT, WINDOWS XP, WINDOWS VISTA, WINDOWS 2000, WINDOWS XP, WINDOWS 7, WINDOWS 8, MAC OS, LINUX, IOS, ANDROID, WINDOWS PHONE 7, WINDOWS PHONE 8, and any suitable PDA or palm computer operating system.

In one or more implementations, an image that is available for editing is downloaded by information processor 102 from user computing device 104. Alternatively, an image is downloaded from a remote device, such as a web server or other computing device located over a communication network, such as the Internet. Once obtained, editing options are provided within the editor.

Once the image is ready for editing, a server-to-server transmission (e.g., HTTP POST) may be supported for saving information about the edited image. A publicly accessible (and not password-protected) web service may be configured to be listening. A graphical screen control, such as a "save" button, may be provided in the user interface. After a user selects the button, the image data along with configuration parameters may be passed to information processor 102. Thereafter a temporary image is created on information processor 102 from the image data, and a public link to the temporary image may be transmitted to workstation 104 for saving. The image may be saved to the workstation's 104 local file system, or may be saved to a location remote from workstation 104. In the latter case, the edited image may be saved to a location where the user has provided authentication, such as during an active secure session (e.g., to a FACEBOOK album). In one or more implementations, the SDK provides functionality to enable a user to abort a save process.

In connection with cropping an image, options may be provided for particular formats, such as 4×3, 16×9, 60×50, or the like. In an embodiment, a comma-separated (or the like) list of preset crop sizes or ratios is provided for the crop tool. For example, the list may include a 2-D array (with labels), a 1-D array (without labels), or a comma-separated string (without labels). In an embodiment, any sizes that are not supported by a particular display are excluded in the user interface.

Various other image editing functionality, such as shown and described herein, may further be defined via the SDK.

Figure 3C:
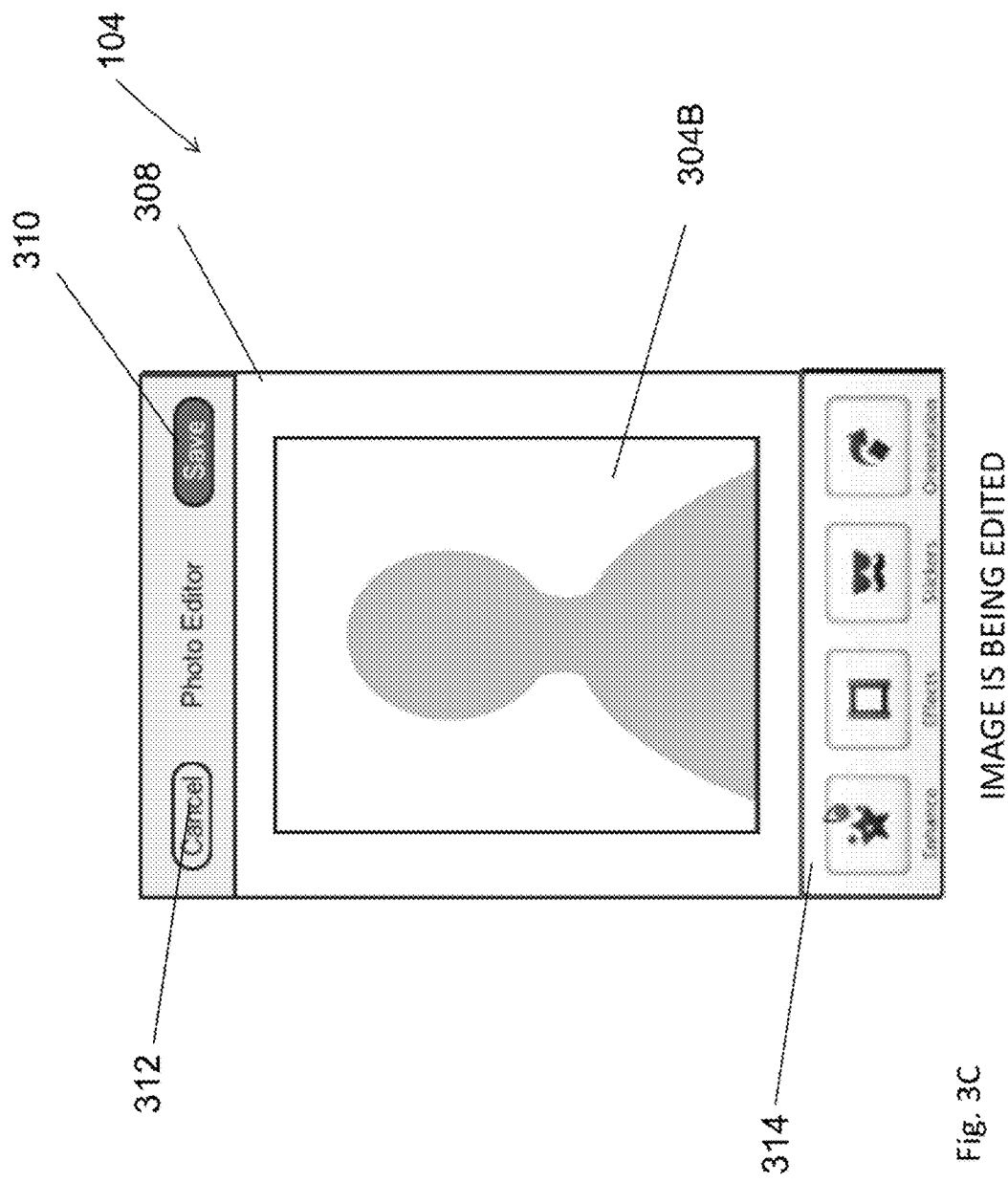

FIGS. 3A-3D illustrate example screen displays of an implementation of the present application. In the examples shown in FIGS. 3A through 3D, a "native" developer's software application 302 is running on a user computing device 104. Application 302 can be virtually any software application that is configured to interface with an API provided as a function of a respective SDK and may include functionality for an image editor, in accordance with teachings herein. Image 304A is viewed on device 104 and may have been obtained from any storage location accessible to device 104. For example, image 304A may originate from the device's 104 local file system, from an Internet website that device 104 is connected to or from any other location accessible by device 104. Also included in FIG. 3A is "edit this photo" button 306 that, when selected, causes the image editor in accordance with the present application to appear for editing operations on image 304A.

FIG. 3B illustrates an example screen display after a user has selected button 306. Once selected, image editor 308 appears with image 304B pre-loaded therein for editing operations. Image 304B is a version of image 304A. In the example shown in FIG. 3B, image editor 308 appears by sliding upward and overlays the software application 302. After a user edits image 3 04B, such as described below, the user may select save button 310 or may select cancel button 312 to save or discard the changes made to image 304B, respectively.

Figure 3D:
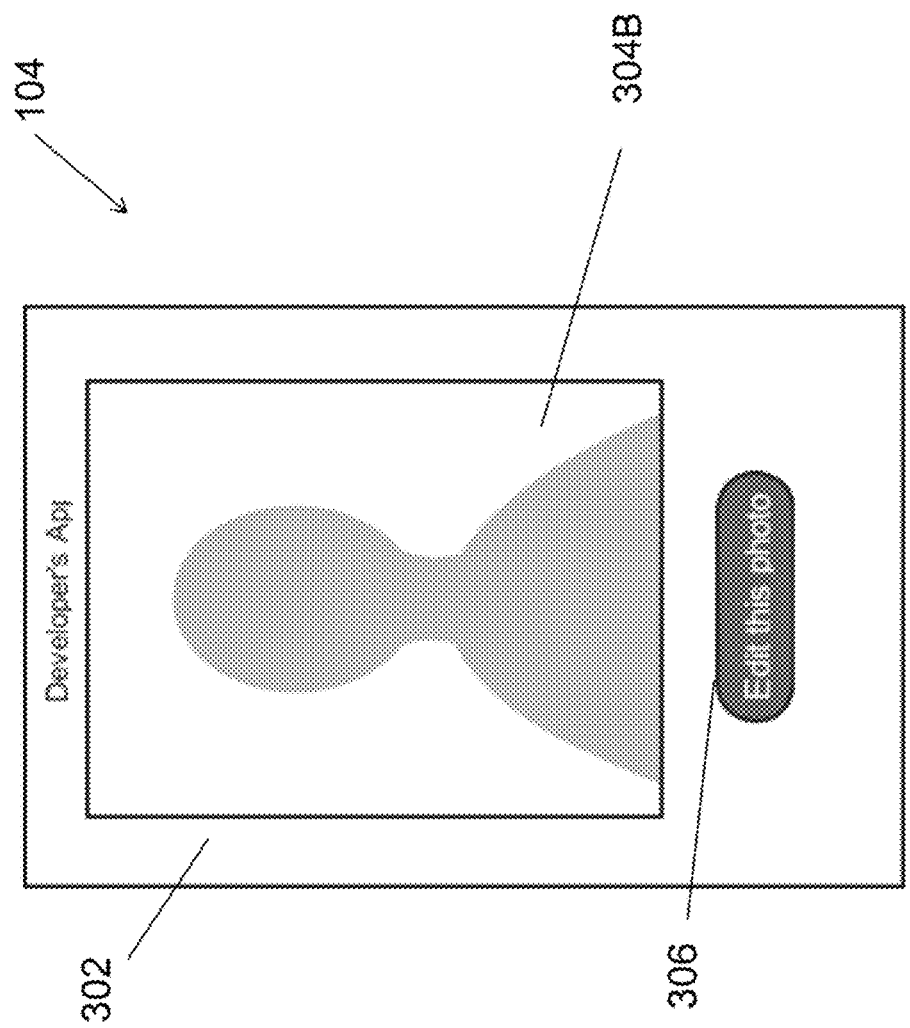

FIG. 3C illustrates image editor 308 operating on device 104. As shown in FIG. 3C, options panel 314 includes selectable icons for enhancing image 304B. In an embodiment, options panel 314 includes many selectable options for image editing, which may be made visible and selectable by dragging additional options into view. In the example shown in FIG. 3C, image 304B has been edited such that the person represented in the image has changed to be shaded. After the user has completed selecting editing options, the user selects save button 310. The image 304B is saved and image editor 308 disappears and the native software application 302 appears with image 304B displayed therein (FIG. 3D). In case the user wishes to edit the image further, the user selects button 306, which triggers instructions for image editor 308 to reappear.

Figure 4C:
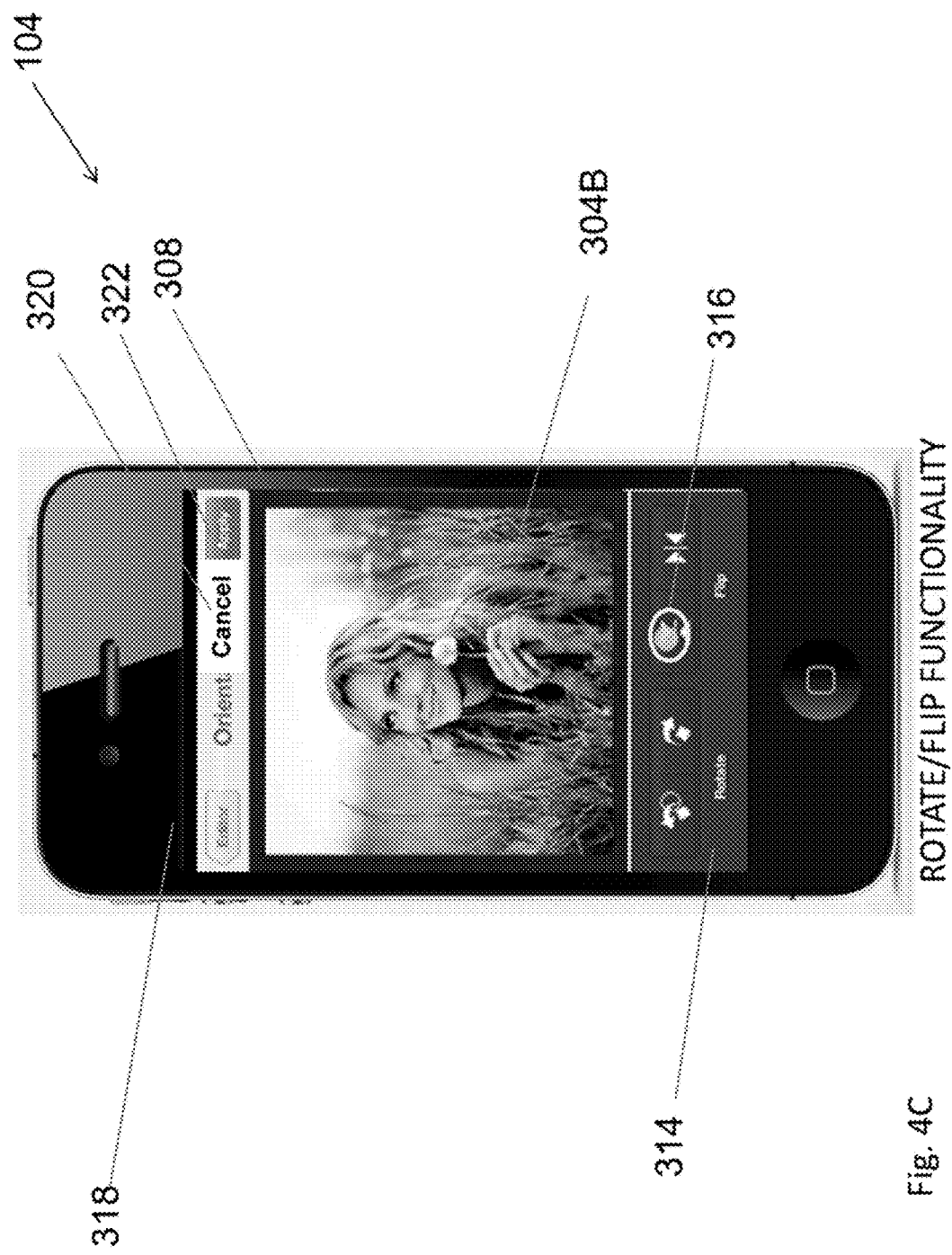

FIGS. 4A-4G illustrate example screen displays provided on mobile user computing device 104 and accordance with an example implementation of the present application. As shown in FIG. 4A, image 304B is loaded in image editor 308 and options panel 314 is provided for applying functionality provided by a respective SDK. As illustrated in FIGS. 4A-4G, the selectable choices (e.g., icons) provided in options panel 314 may change in accordance with a particular context. In the example shown in FIG. 4A, icons are provided in options panel 314 for enhancing the image 304B, for adding effects, for adding stickers and for changing the orientation of image 304B. In the example shown in FIG. 4A, the user has moved selection pointer 316 (the mouse) over the enhance icon in options panel 314. Also illustrated in FIG. 4A is completion panel 318, which includes options for completing a particular operation such as saving or canceling an editing process. In the example shown in FIG. 4A, options are provided that include "save" button 310, as well as an option for closing image editor 308 and returning to the software application 302 (FIG. 3A).

FIG. 4B illustrates image 304B that has been enhanced by a user after selecting auto enhancement functionality from options panel 314 (FIG. 4A). By selecting the auto enhancement option, image 304B is modified, for example, by increasing brightness and contrast, saturation, and/or sharpness levels. In the example shown in FIG. 4B, options panel 314 includes other enhancement options, which include options to cause image 304B to appear as it was taken at night, to increase the appearance of backlighting of image 304B, and to adjust color balance settings. Once the user is finished with enhancement options, the user may select a control from completion panel 318, including "cancel" option 320 to cancel the enhancement options, or "apply" option 322 for applying the enhancement options. Although the example shown in FIG. 4B includes "cancel" option 320, one or more respective mobile computing devices may provide a cancel feature that is included in a native interface. In such cases, "cancel" option 320 may be omitted, depending upon the particular implementation.

It should be recognized that options provided in option panel 314 may be implemented as a function of one selection (e.g., a single click) or multiple selections, and complex editing functionality may be provided in various ways. In one or more implementations, the present application provides an improvement over complex image editors, such as PHOTOSHOP, which requires a detailed understanding of a complex user interface, as well as proper use of controls that go well beyond the scope of an average user desiring to improve the look of an image. By selecting a single control, such as for contrast, the present application adjusts one or more features associated with an image to arrive at a well-balanced and attractive result.

FIG. 4C illustrates image 304B that has been enhanced by the user after selecting rotate/flip functionality from options panel 314. In the example shown in FIG. 4C, options panel 314 includes controls for modifying the orientation of image 408B, including to rotate and flip image 304B. Image 304B appears "flipped" in FIG. 4D.

FIG. 4D illustrates image 304B that has been enhanced by the user after selecting saturation functionality from options panel 314 (and flipped functionality in FIG. 4C). In the example shown in FIG. 4D, options panel 314 includes a rotating slider control that, when selected by the user, causes instructions to be executed to adjust the color saturation levels to change. The location of pointer 316 on the slider control represents amount of saturation the user is selecting. Once the user is finished with saturation option, the user may select a control from completion panel 318, including "cancel" option 320 to cancel the enhancement options, or "apply" option 322 for applying the saturation option.

Figure 4E:
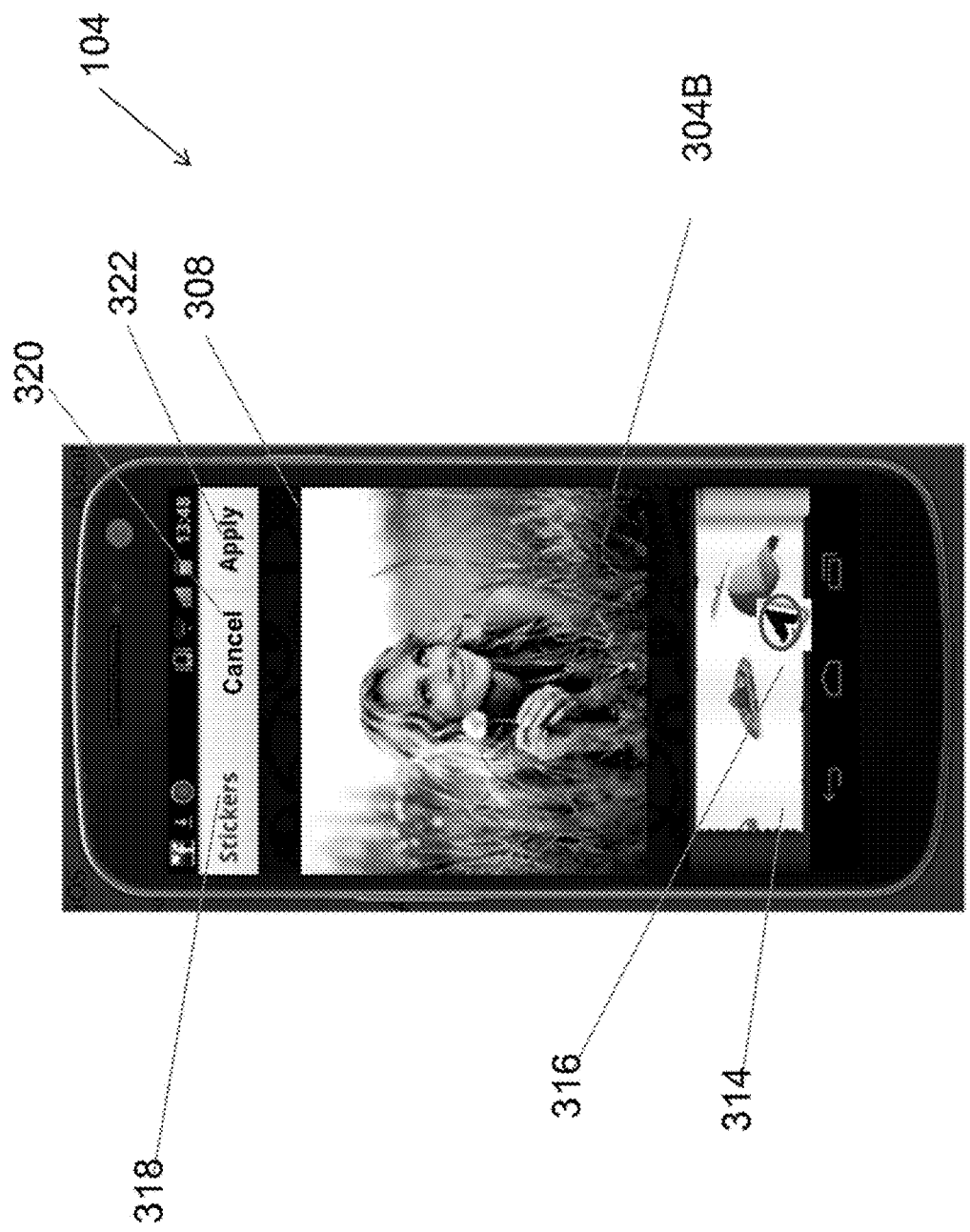

FIG. 4E illustrates example "stickers" options to apply to image 304B that are available in options panel 314. In the example shown in FIG. 4E, options panel 314 includes a number of hats, including a sombrero and a beanie cap that, when selected by the user, causes instructions to be executed to add a hat to image 304B. The location of selection pointer 316 on the selectable controls represents the respective hat that the user is choosing. Once selected, the user may size, rotate and/or drag the hat anywhere within image 304B. Once the user is finished with stickers option, the user may select a control from completion panel 318, including "cancel" option 320 to cancel the enhancement options, or "apply" option 322 for applying the sticker option. The selected hat, as well as its size and rotation, is illustrated in FIG. 4F.

Figure 4G:
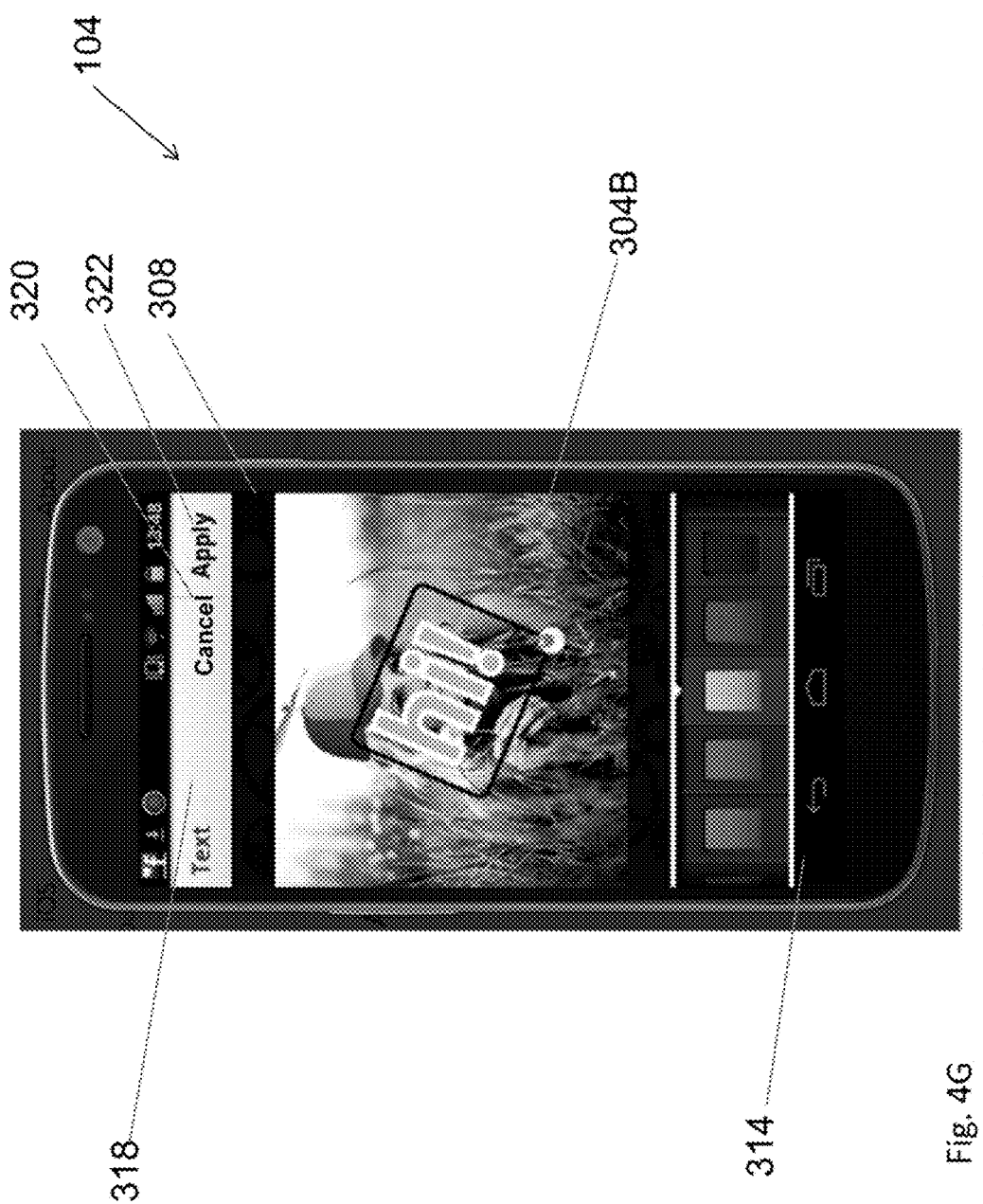

FIG. 4F illustrates additional controls that are provided in optional panel 314, including controls for sharpness, drawing, text, meme-generation. FIG. 4G illustrates options for adding color for text. Other options may include adding an indiglow, conconcorde, aqua or other effects to image 304B (not shown).

FIGS. 5A-5G illustrate example display screens associated with implementations of the present application associated and that demonstrate effects of some controls set forth in options panel 314. The display screens shown in FIGS. 5A-5G illustrate associated image editing options in accordance with an image editor usable, for example, on a user-computing device 104, such as a computing device operating a web browser software application.

Figure 5A:
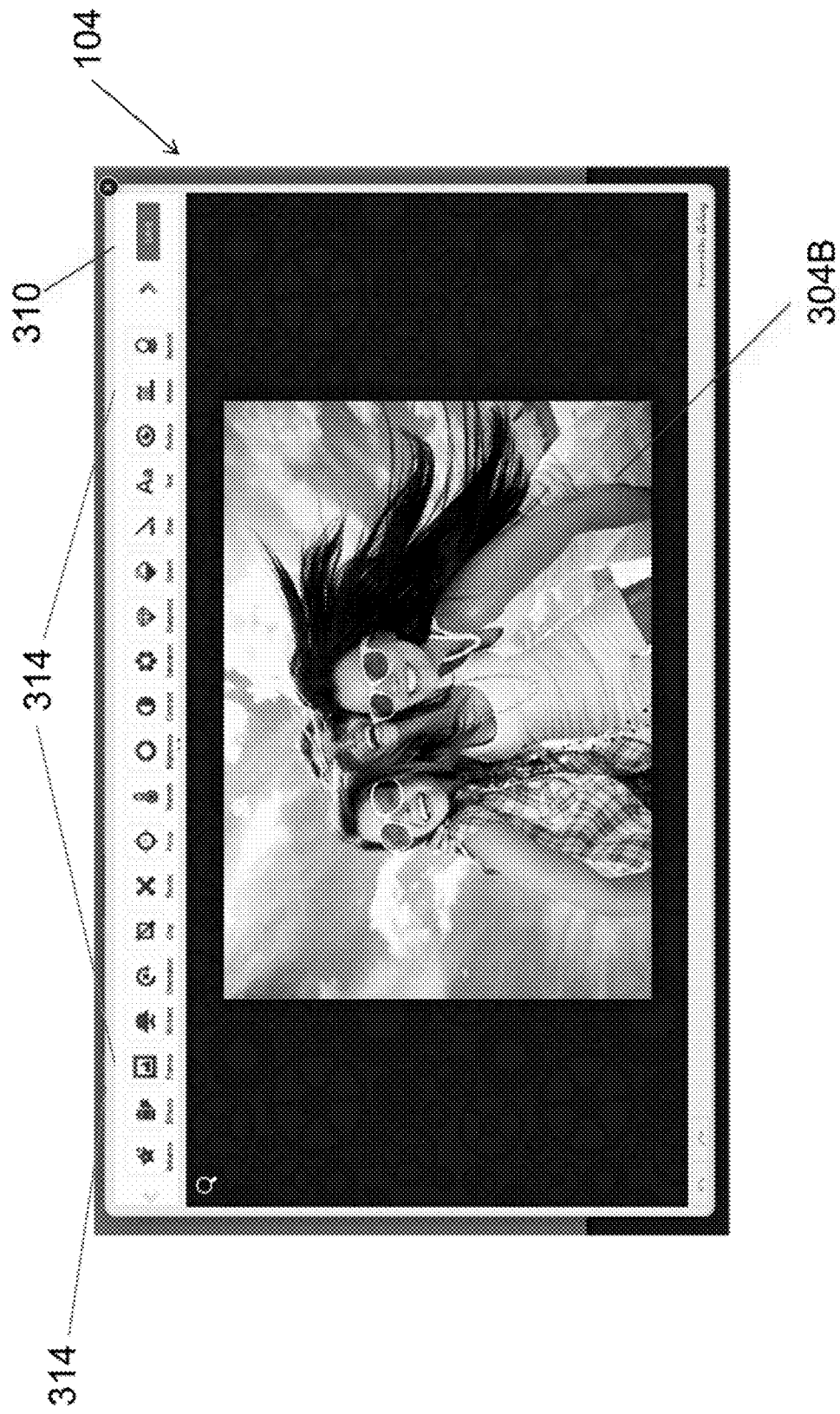

As shown in FIG. 5A, options are provided in option panel 314 that include enhance, effects, frames, stickers, orientation, crop, resize, focus, warmth (e.g., for color temperature), brightness, contrast, saturation, sharpness, splash, drawing, adding text, removing redeye, whitening, and blemishing. Moreover, additional effects options may be provided, for example, by selection of effects navigation arrows 314. In the example image 304B shown in FIG. 5, the sunglasses were added from stickers option control.

Figure 5B:
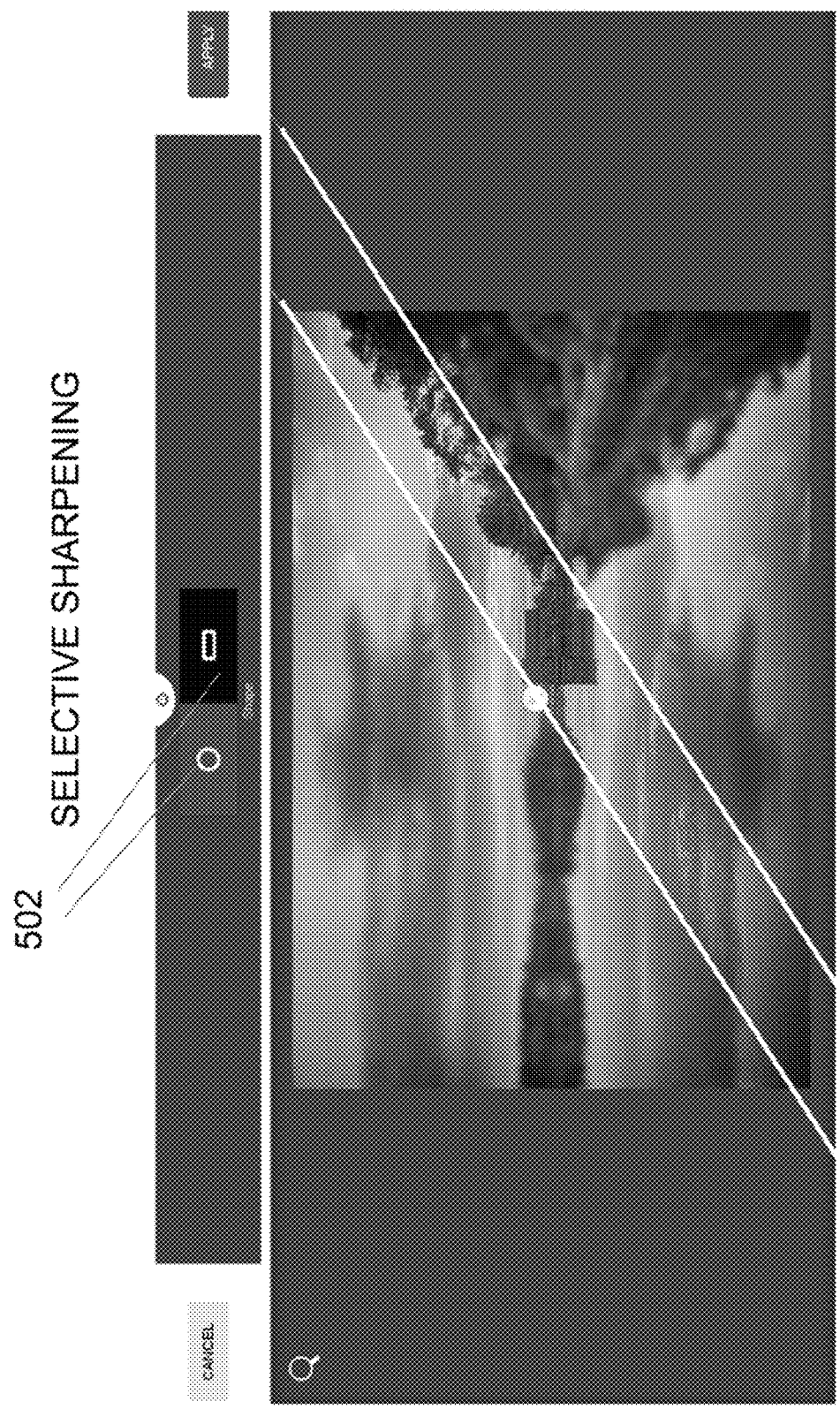

FIG. 5B illustrates an example display screen that is associated with selection of the sharpen control from option panel 314. Sharpen control may be configured with selections for operation in various ways, such as provided via shape controls 502. In the example shown in FIG. 5B, shape controls include a round option and a rectangular option, which enable selective sharpening in accordance with the selected shape control 502. Rectangular shape option 502 has been selected in the example screen display in FIG. 5B, and is sizable and movable according to a user's preference. In the example shown in FIG. 5B, rectangular shape option 502 has been positioned diagonally over the image for selective sharpening within the rectangle, and the portion of the image outside of the rectangle appears blurred.

Figure 5C:
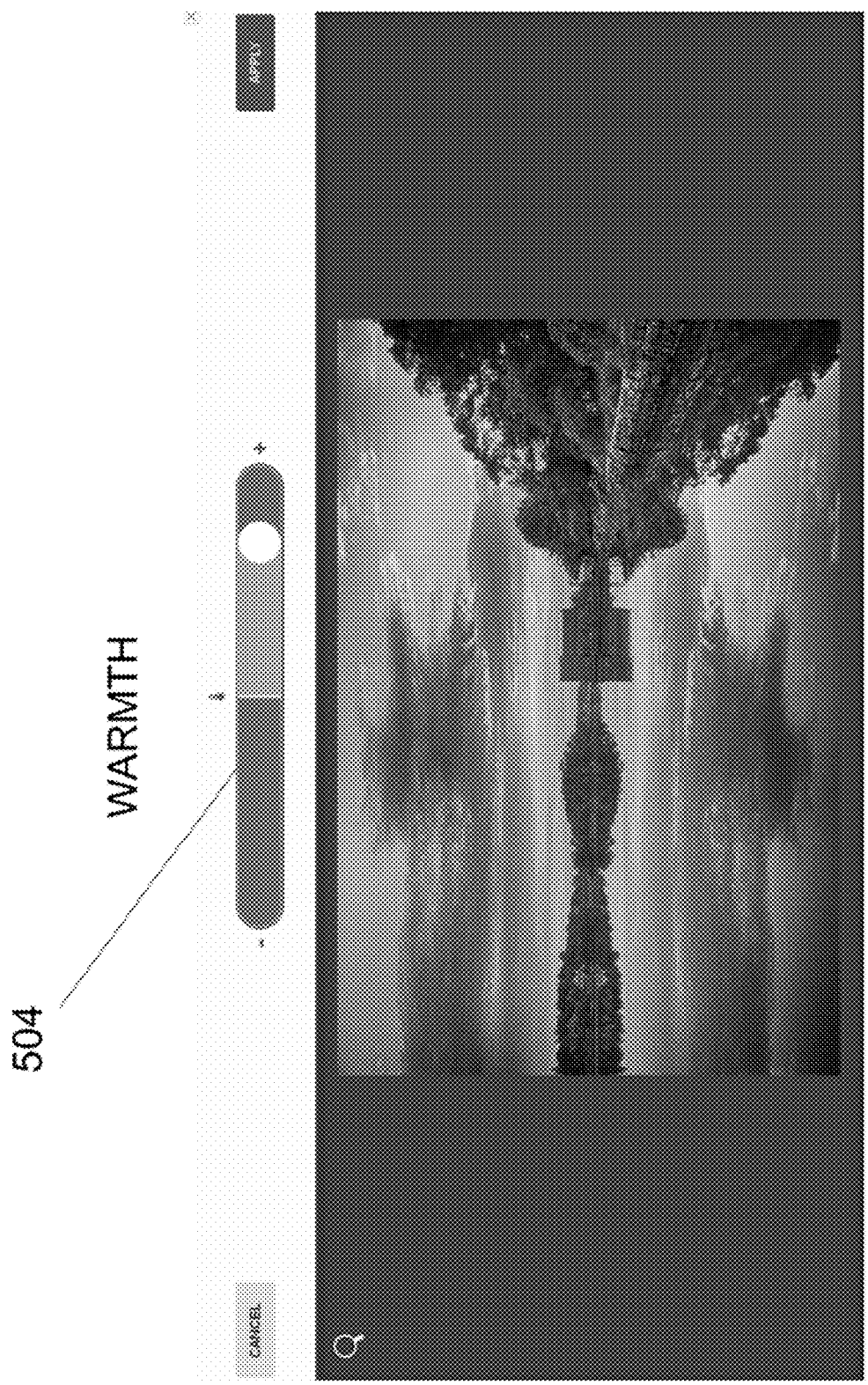

FIG. 5C illustrates an example display screen that is associated with selection of the warmth control from option panel 314. Warmth control may be configured for operation with a slider mechanism 504, which is selectable and is usable to cause instructions to be executed to increase or decrease the warmth, as known in the art, of an image. For example, selecting warmth slider mechanism 504 results in an image becoming bluer or redder, depending upon the direction that the slider 504 moves.

Figure 5D:
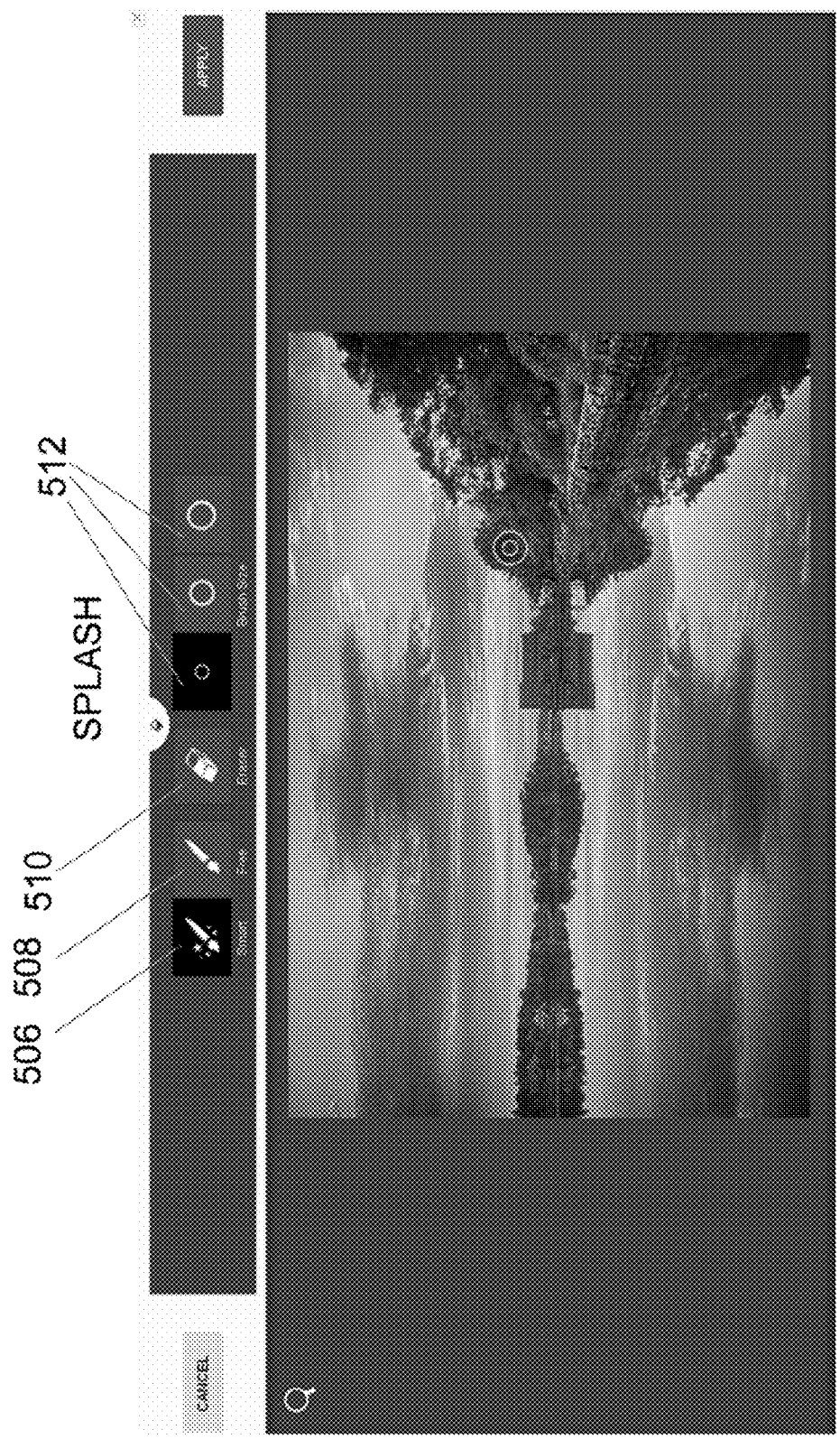

FIG. 5D illustrates an example display screen that is associated with selection of the splash control from option panel 314. In one or more implementations, splash control enables color or other image feature to be provided in creative ways. For example, a color image may be converted to black and white, and splash control selectively re-introduces color in the image. Splash control may be configured with selections for operation in various ways, such as provided via controls 506-512. In the example shown in FIG. 5D, smart control 506 provides for selective introduction of an effect, such as color, with awareness of a particular context. In the example shown in FIG. 5D, for example, using smart control 506 over the barn structure near the center of the photograph may introduce color to the barn only, and without introducing color to surrounding areas (e.g., the sky or water). Free control 508 may be similarly used for introducing an effect, such as color, but without the smart awareness of the smart control 506. For example, using free control 508 over the barn may introduce spillover color into the water and sky, in addition to the barn. Eraser control 510 enables the user to remove the effect, such as color, that was introduced (or reintroduced) into the image. Moreover, smart control 506, free control 508 and eraser control 510 are sizable, such as via brush size control options 512.

FIG. 5E illustrates an example display screen that is associated with selection of the blemish control from option panel 314. Blemish control may be configured with selections for various sizes 514 that, when selected, provide selective blurring or blemishing to an image. In the example shown in FIG. 5E, the right-hand portion of the image appears blurred via blemish control.

Figure 5F:
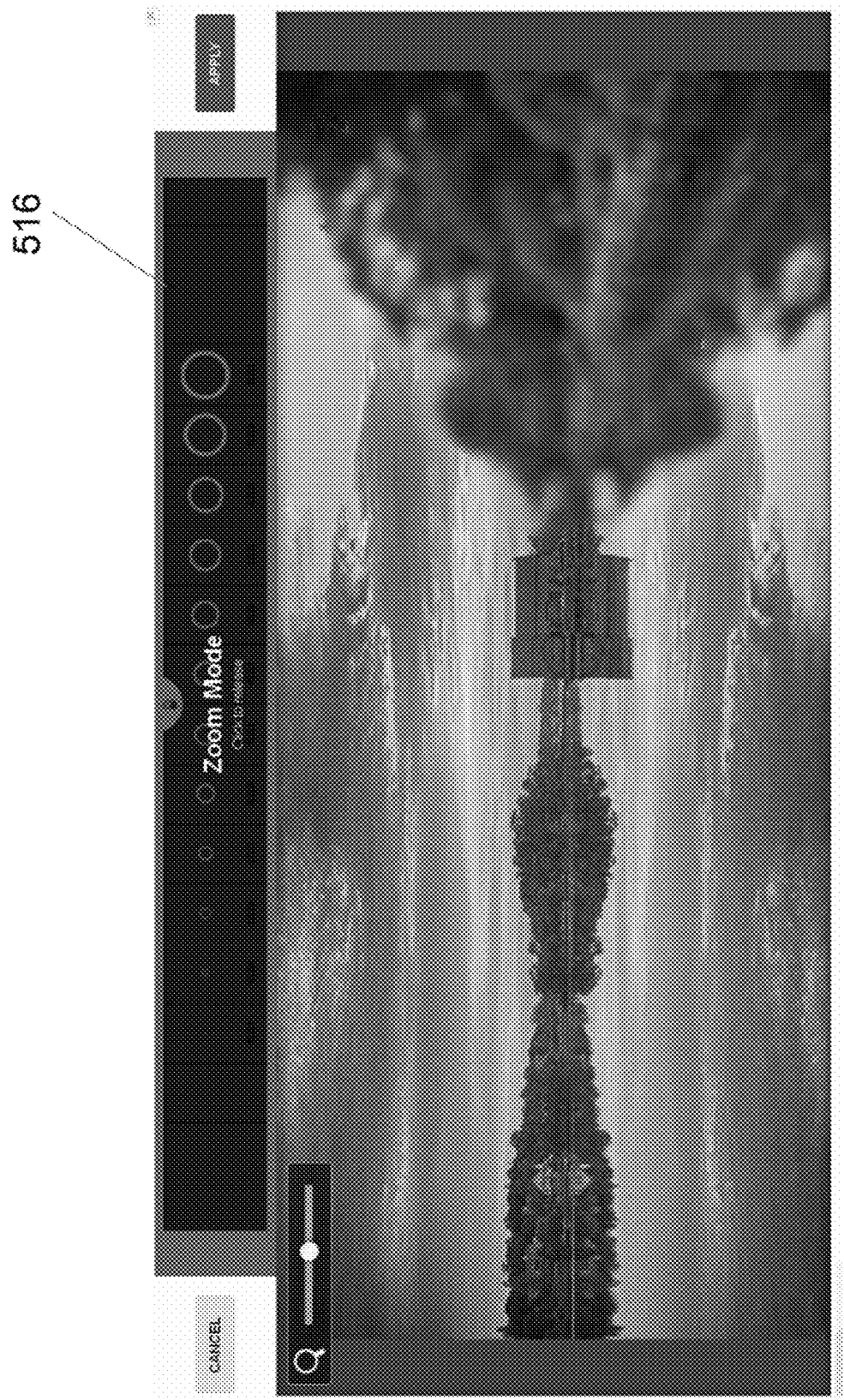

FIG. 5F illustrates an example display screen that is associated with selection of a zoom control 516, to selectively zoom in or out of an image. Zoom functionality enables, for example, greater precision to edit or otherwise modify smaller portions of an image, as well as to visualize the degree of an effect applied to an image by a user.

Figure 5G:
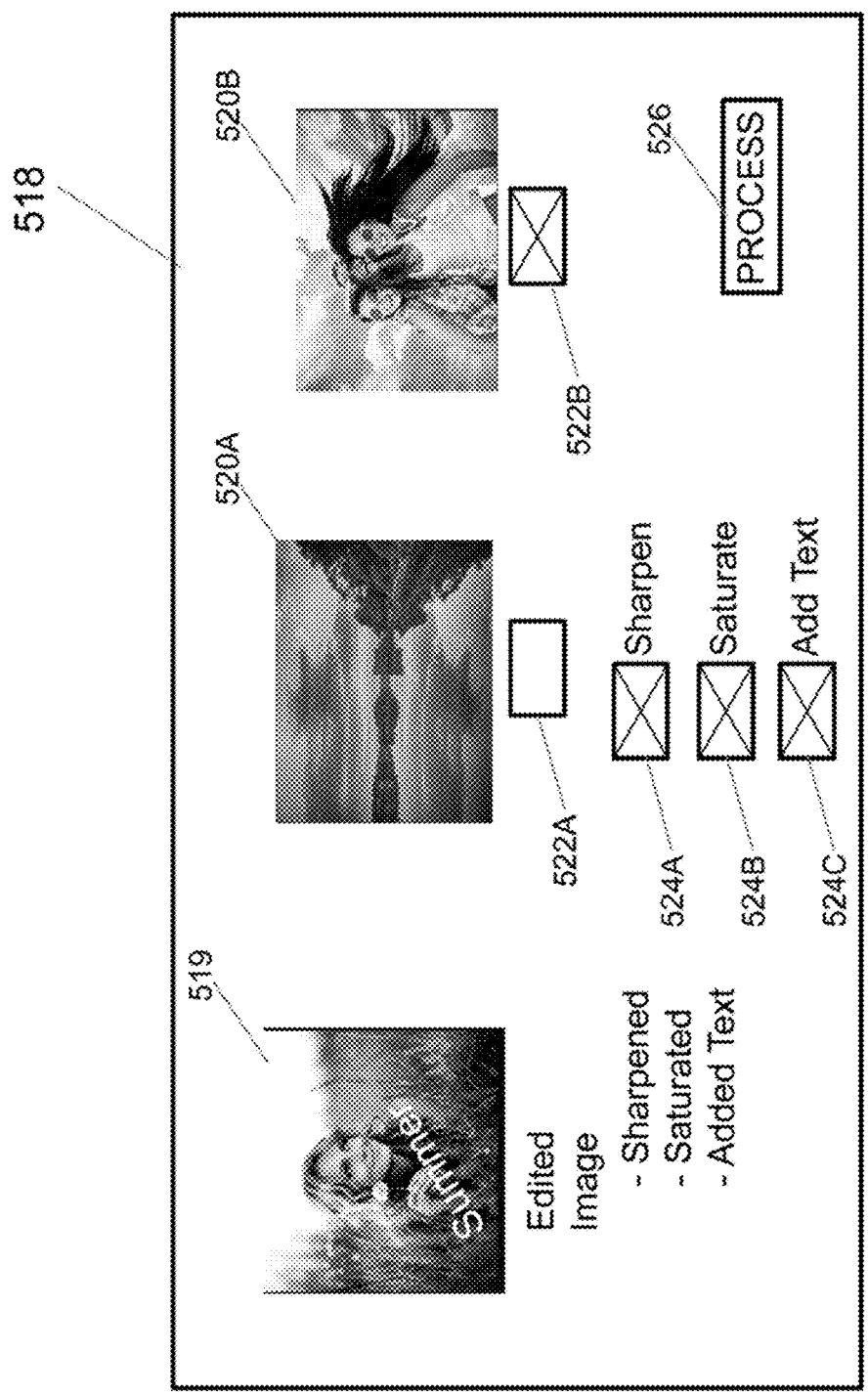

FIG. 5G illustrates an example display screen 518 that is provided to process one or more images with functionality that corresponds to editing applied to one or more other images. In accordance with one or more implementations, after an image is edited in accordance with the teachings herein, the present application supports identifying, without human user intervention, at least one other image that may be, for example, stored in an image library and appropriate for similar or identical editing. Alternatively (or in addition), all images in a respective image library may be identified and shown. As shown in the display screen 518, image 519 is displayed that represents an image that was previously edited by the user. The respective editing processes that were applied to the image are further displayed, and include that the image was sharpened, saturated and text was added. Images 520A and 520B were selected substantially automatically to be edited with one or more of the editing processes that were applied to image 519. The selection of images 520A and 520B may have been made as a function of GPS information associated with images 519-520B, by a date and/or time stamp of the images, and/or by a comparison of the images. For example, a respective portion of each of the images may analyzed and compared (including at the relative pixel level) to determine whether two or more images are similar enough to have one or more editing processes applied thereto. Moreover, in one or more implementations, editing processes applied to a low-resolution version of an image may be applied to a high-resolution version of the image. Thereafter, high-resolution images may be identified, such as in accordance with the above-identified variables, and low resolution versions of the images may be displayed in the display screen 518 for editing.

Continuing with reference to FIG. 5G, selectable prompts 522A and 522B are illustrated and provided for a user to identify which of the images to edit with one or more of the editing processes applied to image 519. Further, selectable editing options 524A, 524B and 524C are provided for a user to identify which of the editing steps previously applied to image 519 the user wants to apply to image 520A and/or 520B. The selectable prompts 522A and 522B may be configured to be preselected or not preselected, or processing may occur to configure one or more of prompts 522A and 522B to alternate between selected and not selected as a function of one or more editing options 524A, 524B and 524C that the user selects. For example, image 520A may be construed by computing device 104 to be sufficiently saturated, and a selection by a user of editing option 52413 (corresponding to saturation) may result in a deselection of selectable prompt 522A, thereby prompting the user not to proceed with further saturating image 520A. When the user is satisfied with the combined selections of images and processes to apply thereto, the user selects PROCESS control 526 and the associated editing functions are applied to one or more of the respective high resolution and low resolution versions of the respective images. Thus, as shown and described above with reference to FIG. 5G, the present application is usable to make complex editing steps to a plurality images that are automatically and/or manually selected from an image library.

Thus and as illustrated in FIGS. 3A-3D, 4A-4G and 5A-5G, the present application enhances functionality associated with virtually any existing software application by enabling users to edit images within the software application and without requiring a user to switch the focus to a different application, to exit one application and/or to launch another. Moreover, the images illustrate a streamlined, convenient and sophisticated workflow associated with an implementation. Moreover, the image editor according to the present application is embeddable, and may be added to any website or mobile applications with just a few additional lines of code as a function of an API. The editor is easy to integrate, and includes many complex tools that may be implemented by a single "click." For example, a filter (as known in the art) is provided that provides automatic enhancement of an image, such as to correct one or more of brightness, contrast, saturation, sharpness, exposure, crop, straighten, orientation or the like, in accordance with preconfigured or user-custom preferences.

Further, in an embodiment a quick-launch option may be provided to enable a user to access one or more features independently and without a need to launch a full image editor. In this way, a user may view an image and adjust one setting, such as contrast, independently. Thus, the image editing tools provided in accordance with the present application are powerful, yet simple to use to reduce or even eliminate a learning curve often experienced by beginners of image editing software applications.

In an implementation of the present application, a "key" may be used for gaining access to the SDK and one or more application programming interface(s) associated therewith for employing the teachings herein. The key may be generated each time a developer generates an API for use in one or more software applications. One or more keys may be used, such as a key associated with an application programming interface, for supporting customization of one or more "widgets" associated with programming code generation. In an embodiment, respective SDK's are provided for various platforms, such as mobile device platforms (e.g., for iOS, ANDROID and WINDOWS PHONE). A respective key may be provided for each of a plurality of web site domains or, alternatively, a single key may support a plurality of web site domains, depending on a particular implementation of the present application.

The present application supports a plurality of languages, and may include translations for the image editor in Catalan, Chinese (simplified/traditional), Dutch, French, German, Indonesian, Italian, Japanese, Korean, Latvian, Lithuanian, Polish, Portuguese (Portugal, Brazil), Russian, Spanish, Turkish, Thai, Arabic and Bahasa Indonesian and Vietnamese.

In accordance with an implementation, a JAVASCRIPT ("JS") file is obtained (e.g., downloaded) and is loaded for configuring a widget instance with a configuration object. Once configured, a document object model ("DOM") is provided and a widget instance may be launched.

An API in accordance with an implementation of the present application resembles the known JQUERY plug-in pattern, in which a configuration object is passed that includes key/value pairs. A variety of configuration parameters may be supported. In an implementation, an image to be edited is located in a publicly-accessible folder, such as on the Internet. As noted above, an API key may be required, such as for saving an image following an edit process. An API key that is generated for implementing the teachings herein may use a root domain name, notwithstanding use of the API key on subdomains.

In order to provide additional customizing of the image editor to improve the user experience, more generally, the present application supports custom cascading style sheets that may be provided in a default configuration. For developers who desire significant customization, a parameter may be provided in the SDK for invoking a blank canvas. Alternatively, a style guide widget can be provided for one or more customized appearances, such as textures, background images, header and footer content, buttons, icons, input fields, labels or the like.

Other customization options include background color, foreground color, accent color(s), colors of one or more bars (e.g., title bar, left-most bar, or the like), button icon colors, text formats, and animation options.

As noted above, a plurality of respective SDKs may be provided in connection with one or more operating systems and/or platforms. Depending upon the particular environment, a respective compiler such as APPLE's LLVM (included with XCODE) and the ANDROID compiler (e.g., via ECLIPSE), may be required for implementing the teachings herein in accordance with the SDK. A discussion regarding three example mobile computing device operating systems is set forth below.

In an embodiment and in connection with an existing application that runs under IOS, files associated with the SDK are copied into a project, and libraries and frameworks are linked therewith. Resources are copied in the build phase, and linker flags are added and headers are imported. By displaying an instance of one or more class files (or subclass files) the SDK may be used and a controller displayed, and one or more methods implemented and used. One or more session objects may be created upon initializing the editor and can remain open until a user selects a control, such as a button (e.g., "cancel" or "done"), to complete the editing process. As noted above, in an embodiment a session may be replayed onto an input image as a function of a session object that is used to create an instance of one or more class files. For example, a context can be created to render a session onto an input image to comply with one or more parameter settings (such as the size of the image and/or aspect ratio of the input image). In an embodiment, a "completion block" is supplied by a developer as a parameter to a method class. After user completes an image editing session, the rendered image is passed to the completion block.

Figure 6A:
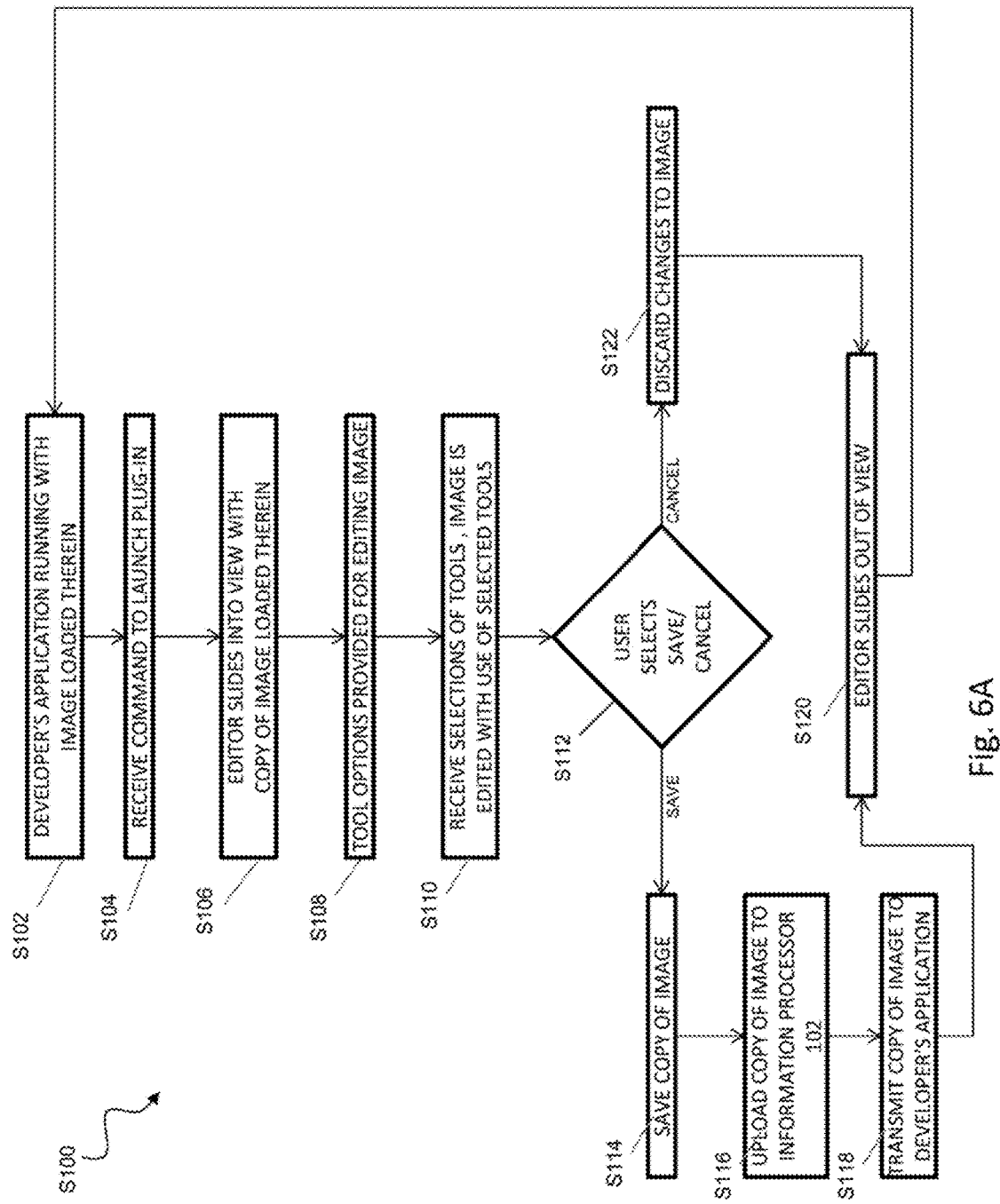
FIGS. 6A-6B illustrate example flowcharts associated with embodiments associated with the present application.

FIG. 6A is a flowchart illustrating examples steps S100 associated with an embodiment of the present application. At step S102, a software application, such as operating on a mobile computing device, is running with an image loaded therein. The software application receives a command from a user for editing the image, which causes the image editor to launch as a plug-in to the software application (step S104). The image editor appears by sliding into view, and a version of the image previously loaded and the software application is loaded therein (step S106). A number of tool options are provided for editing the image (step S108). For example, to all options are provided for affecting brightness, contrast, saturation, sharpness, as well as for adding stickers, meme, text and for free drawing on the image. At step S110, selections of one or more tools are received in the editor, and the image is edited with use of the selected tool(s).

Continuing with reference to FIG. 6A, at step S112, a selection is received, and a determination is made whether the user selected a graphical screen control to save or cancel the editing steps made to this point. If the determination and step S112 is that the user selected a control to save the edit steps, the version of the image in the image editor is saved (step S114). Thereafter, the version of the image is uploaded to information processor 102 (step S116). In alternative embodiments, the version of the image may be saved to be local file system. The version of the image is transmitted to the software application (step S118). Thereafter, at step 120, the editor slides out of view and the native software application reappears. Alternatively if, in the alternative, the determination at step S112 is that the user selected a control to cancel edit steps to this point, the version of the image is not saved (the changes are effectively discarded) and the editor slides out of you (step S120). Thereafter, the process branches back to step S102, as the software application is running with the image, which may be edited as set forth in steps S104 through S118, or not if the changes were discarded and step S122.

Figure 6B:
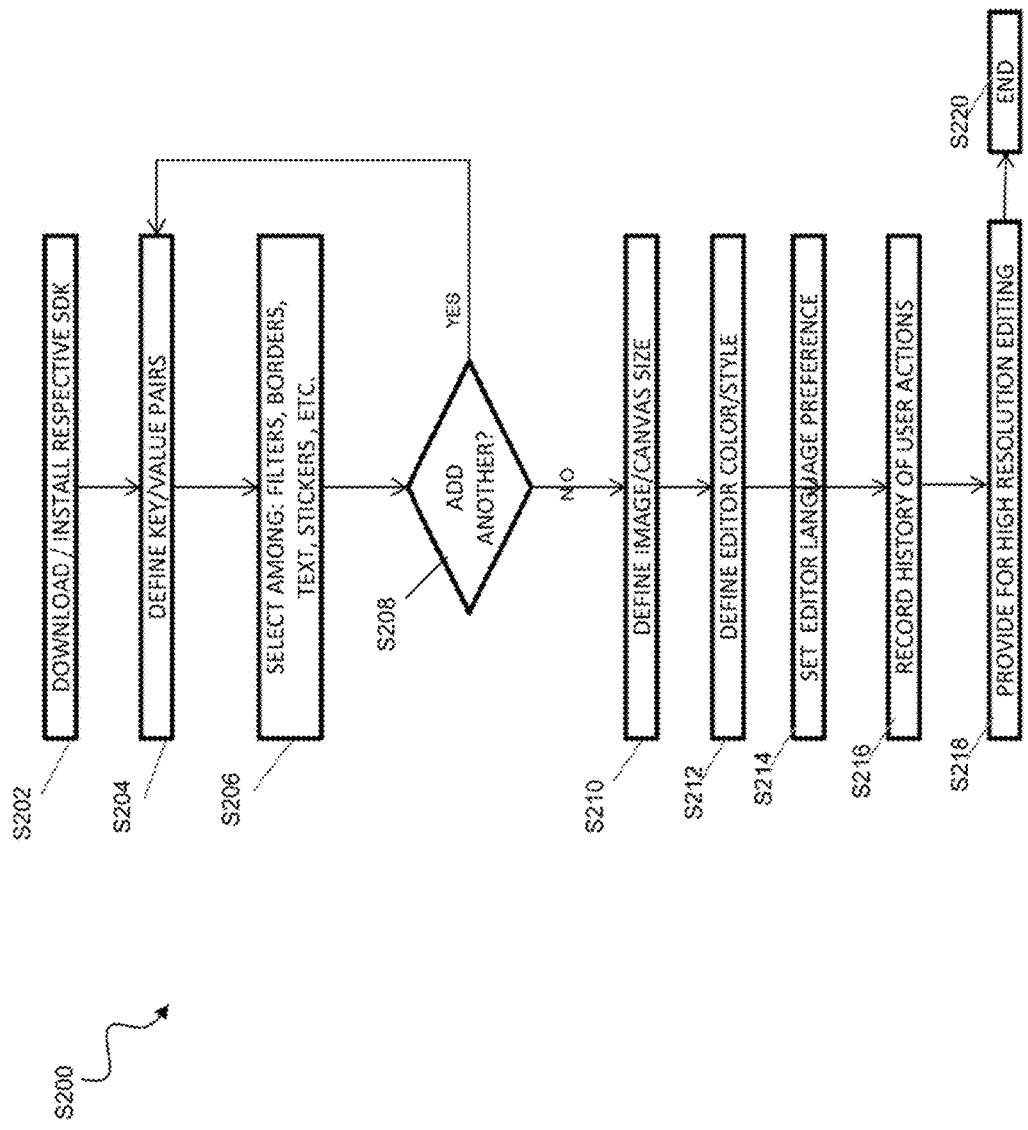

FIG. 6B is a flowchart illustrating examples steps S200 associated with an embodiment of the present application. At step S202, a respective SDK is downloaded and installed for implementing functionality as shown and described herein. For example, a developer of a software application that operates on the ANDROID operating system selects the SDK for developing an image editor plug-in for the ANDROID-based application. Once installed, one or more key/value pairs are defined to provide respective functionality in the image editor (step S204). For example, selections are made among various controls shown and described herein, including, for example, filters, borders, textual content, stickers or the like (step S206). Thereafter, a determination is made whether another key/value pair is defined (step S208). If so, then the process branches back to step S204. If not, and the process continues to step S210, and additional options are provided, such as defining an image and/or canvas size. Other options include defining colors and styles for the editor (step S212). Additionally, language preferences for the editor defined (step S214) as is options for recording a history of user actions for future replaying (step S216). Additionally, options for providing for high resolution and maybe provided (step S218). Thereafter, the processed ends at step 220.

Figure 7A:
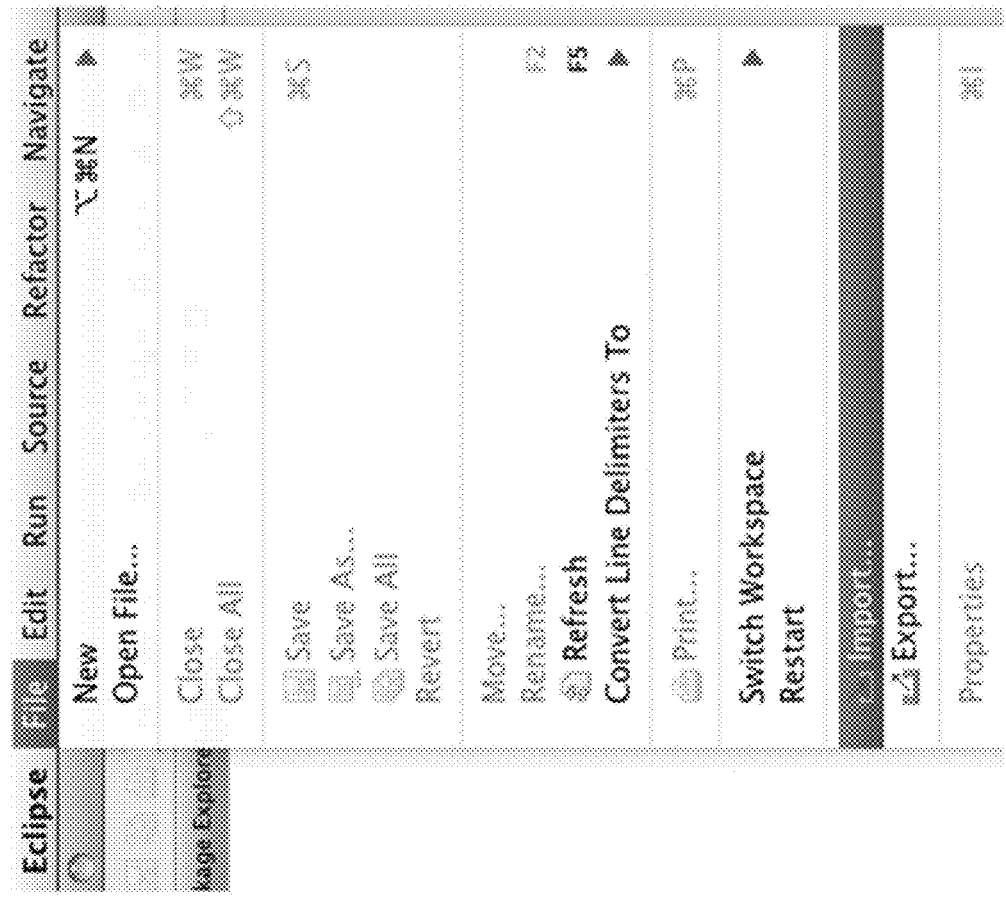
FIGS. 7A-7F are example screen displays that represent installing a software development kit in an example ANDROID environment, in accordance with an example embodiment.
Figure 7B:
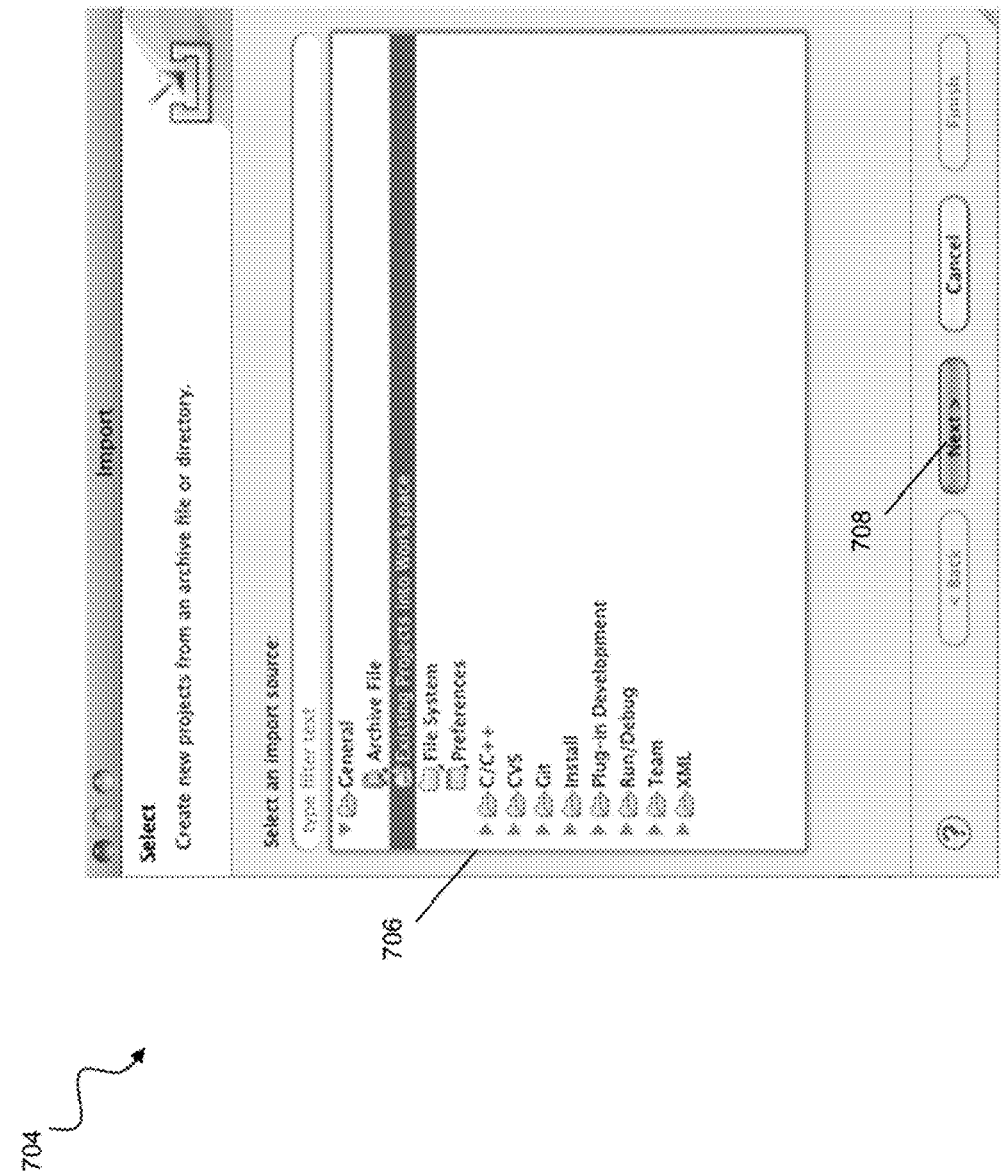
Figure 7C:
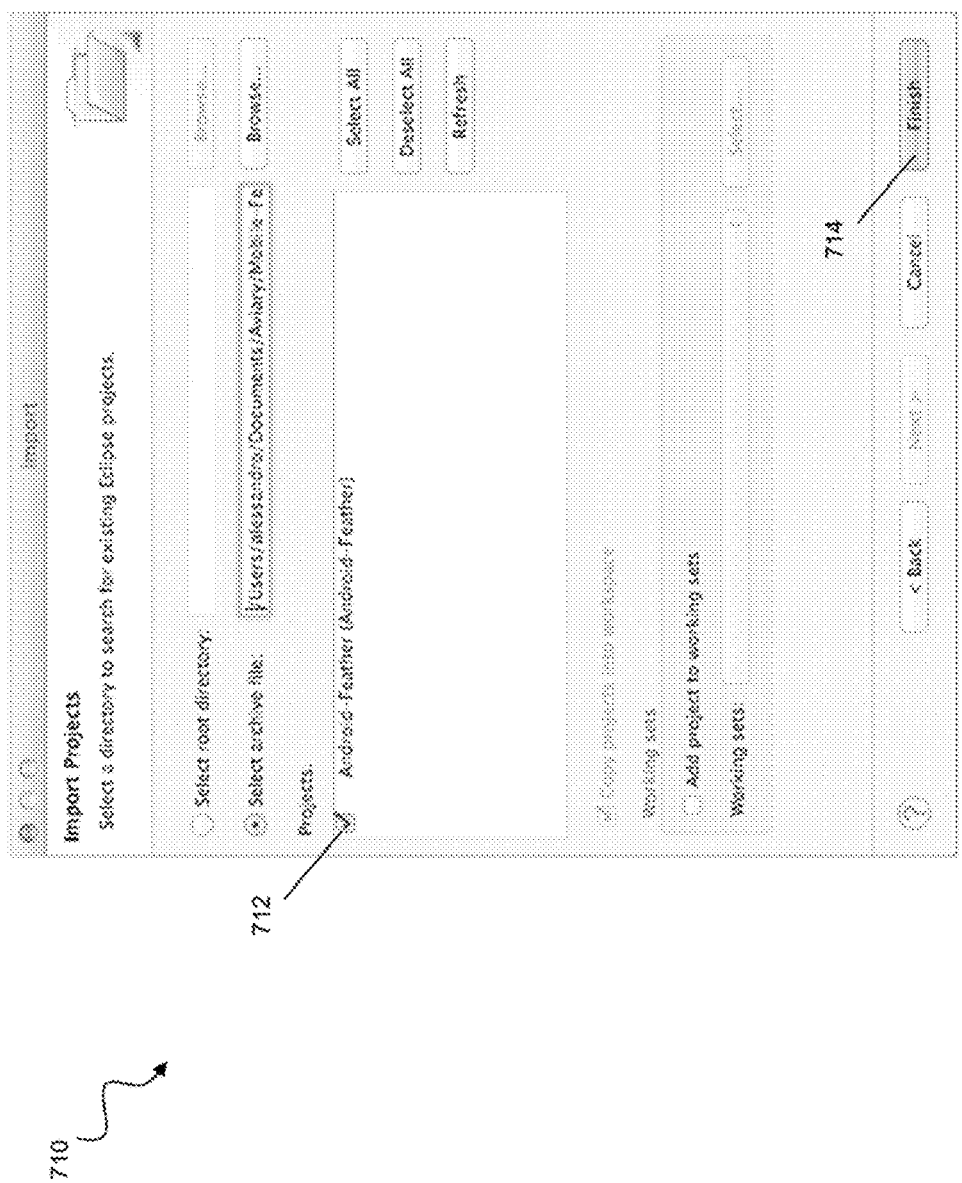
Figure 7D:
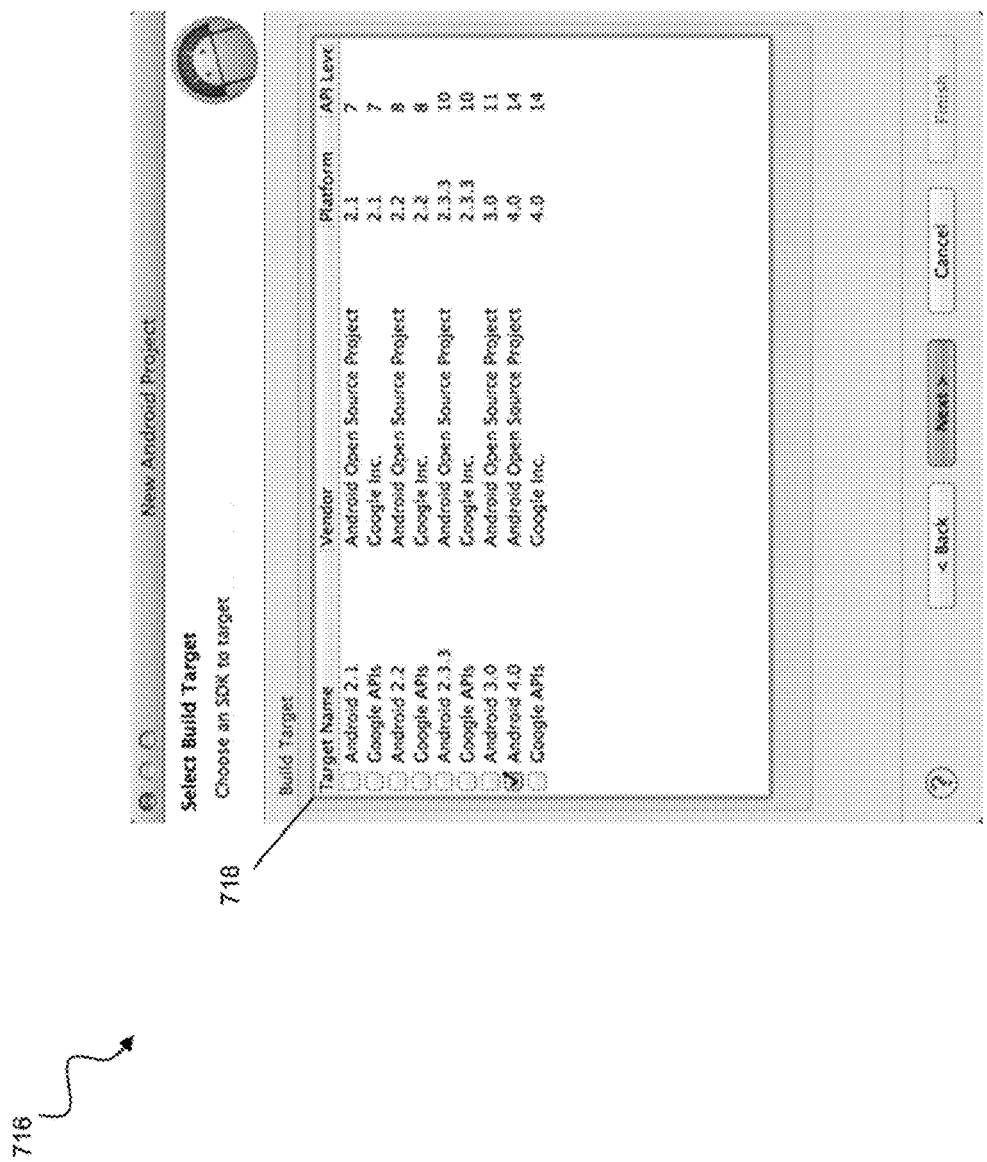

FIGS. 7A-7F are example screen displays that represent installing the SDK in an example ANDROID environment. In the example display screens shown in FIGS. 7A-7F, the ECLIPSE integrated development environment is shown with the Android Development Tools plug-in installed therein. As shown in FIGS. 7A and 7B, an import dialog display screen 704 appears upon selection of an Import menu selection (display screen 702). From the list of import options 706, the option for "Existing Projects into Workspace" is selected and the user selects the graphical control labeled "Next" 708. Thereafter and with reference FIG. 7C, dialog display screen 710 is provided and option 712 is provided for a user to select an archive file. An archive file (e.g., a ZIP file) is selected, and a new android library project is listed to be created in the current workspace. The ANDROID library is included in accordance with an embodiment to using the present application in an ANDROID computing environment, including to edit or otherwise to manipulate images. When the user is satisfied with the respective project, the user selects Finish control 714.

Figure 7E:
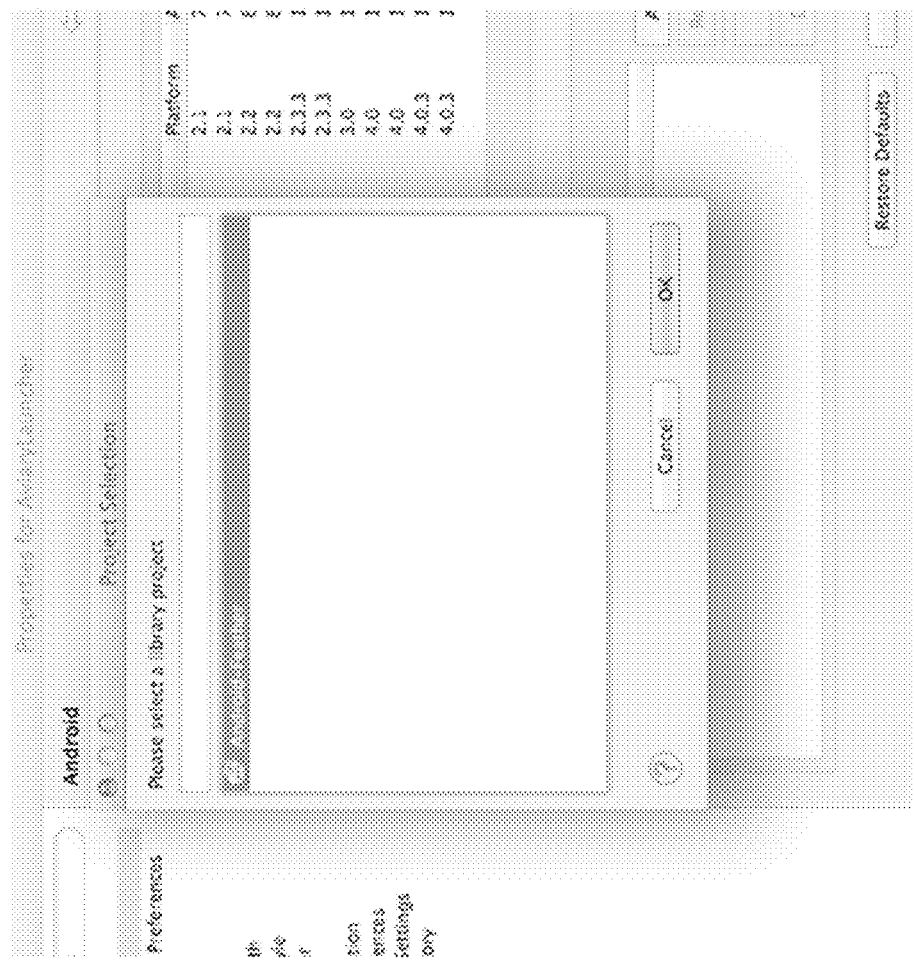
Figure 7F:
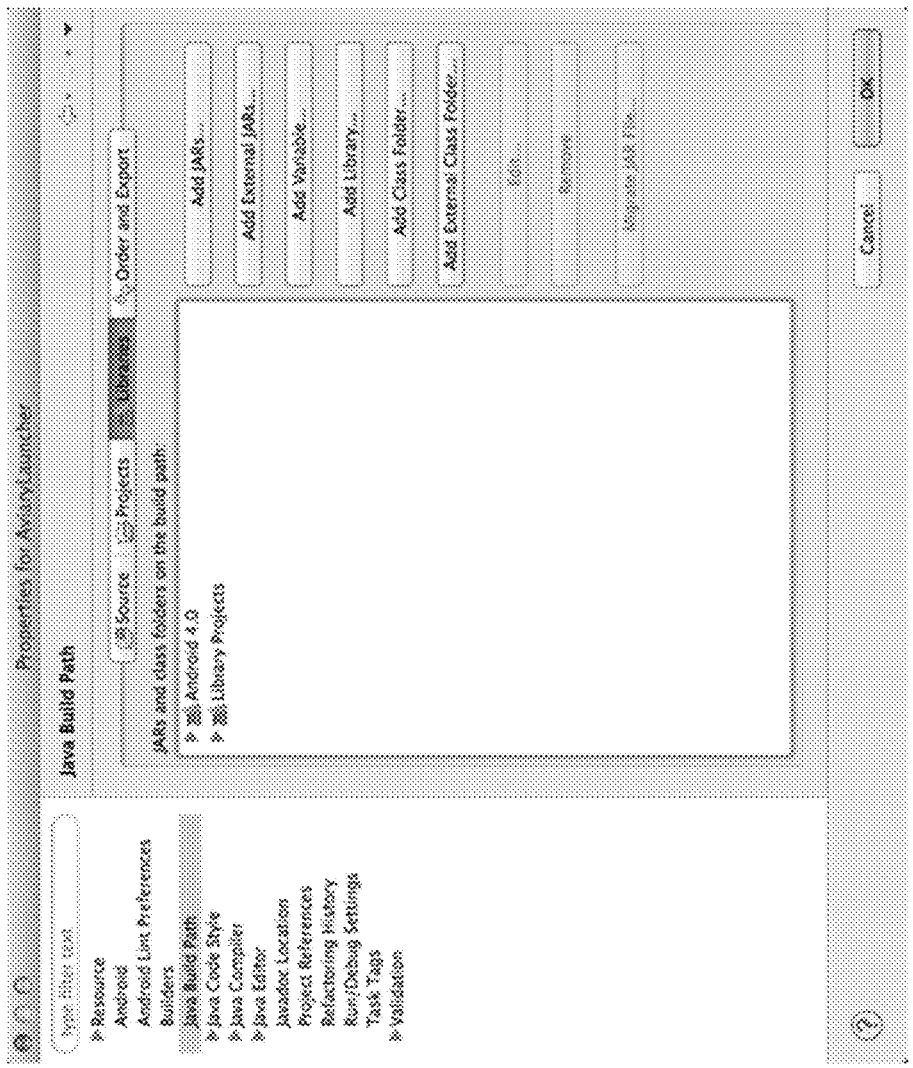

Continuing with reference to FIGS. 7A-7F, an Android application is created in order to use the image editor. Display screen 716 is displayed with options 718 for a user to select a respective SDK project. In the example shown in FIG. 7D, an Adroid 4.0 build target is selected choosing a respective SDK (FIG. 7D), and the library project file is selected in display screen 720 (FIG. 7E). Thereafter, the user navigates to the "Java Build Path" section of the project properties dialog and selects "Add JARs . . . " button of the "Libraries" subsection in display screen 722 (FIG. 7F). A new project is created that preferably includes references previously defined and ready for the developer to use.

In an embodiment, permissions are defined, for example for Internet and write access to external storage. To grant these permissions, entries are added inside the AndroidManifest.xml <manifest> tag. Other permissions may be set, such as to take advantage of native operating system functionality (e.g., vibration feedback).

Thus, as shown, in described herein, the present application supports image/image-editing functionality that is made available within a wide variety of third-party software applications and web sites. In one or more implementations, an image editor is provided that is configured as a plug-in to the software applications and includes options for manipulating image settings, may be integrated into virtually any software program application, including for mobile computing devices. In this way, the present application regards a ubiquitous technology that may be provided in remote software systems.

Well-known brands may be availed of the teachings herein to create useful photo editing experiences for its users. From custom filters to frames to photorealistic stickers, the present application supports playful, positive connections between advertisers and millions of mobile content creators nationwide that may outperform traditional mobile advertising methods by leaps and bounds.

Although the present invention has been described in relation to particular embodiments thereof, many other variations and modifications and other uses will become apparent to those skilled in the art. For example, although many of the descriptions and examples set forth herein relate to still images, the application is not so limited. The SDK may provide support for editing of video, audio and other content that would otherwise require a stand-alone product. It is preferred, therefore, that the present invention not be limited by the specific disclosure herein.

What is claimed:

1. A method, comprising:
   displaying an image in a software application running on a computing device, the display of the image not within an image editing application;
   responsive to receiving a user input to edit the image, replacing the image, by the computing device, with an image editor specific to the image comprising a lower resolution representation of the image displayed in the image editor along with one or more editing tools;
   responsive to receiving a user input specifying an editing operation, modifying the lower resolution representation of the image displayed in the image editor, by the computing device, according to the editing operation and displaying the modified lower resolution representation of the image in the image editor;
   causing a separate modification of the image, by the computing device, according to the editing operation performed on the lower resolution representation of the image; and
   responsive to a user input to leave the image editor, replacing the image editor, by the computing device, with the modified image.

2. The method of claim 1, further comprising:
   identifying, by the computing device, another image stored in an image library that contains the image;
   displaying, by the computing device, the other image in the software application;
   responsive to receiving another user input to edit the other image, replacing the other image with another instance the image editor specific to the other image by the computing device, the other instance of the image editor comprising a lower resolution representation of the other image displayed in the other instance of the image editor along with the one or more editing tools;
   responsive to receiving another user input specifying another editing operation, modifying the lower resolution representation of the other image displayed in the other instance of the image editor by the computing device according to the other editing operation and displaying the modified lower resolution representation of the other image in the other instance of the image editor;
   causing another separate modification, by the computing device, of the other image according to the other editing operation performed on the lower resolution representation of the other image; and
   responsive to another user input to leave the image editor, replacing, by the computing device, the other instance of the image editor with the modified other image.

3. The method of claim 2, wherein identifying the other image is based on one or more of: GPS information associated with the image, a date of the image, and a time of the image.

4. The method of claim 2, wherein identifying the other image includes identifying at least a portion of the image and comparing the portion of the image to at least a portion of the other image.

5. The method of claim 4, wherein the portion of the image corresponds to the portion of the other image.

6. The method of claim 2, further comprising selecting, by the computing device, a low resolution version of the other image.

7. The method of claim 1, wherein the one or more editing tools include one or more of: crop, texture, rotation, stickers, sharpness, blemish, sharpen, red-eye removal, text, brightness, contrast, frames, or saturation.

8. The method of claim 1, wherein the image editor is configured in the software development kit in at least two versions, wherein a first version of the image editor is configured with a first set of editing tools, and a second version of the image editor is configured with a second set of editing tools, wherein the first set includes more editing tools than the second set.

9. The method of claim 8, further comprising tracking distribution of the respective versions of the image editor.

10. The method of claim 1, wherein the software development kit enables the image editor to be operable within mobile computing platforms, Internet web site platforms, and desktop computing platforms through different versions of the image editor.

11. The method of claim 1, wherein the image editor is integrated with the software application through one or more application programming interfaces (APIs).

12. The method of claim 1, wherein the image editor is integrated with the software application through a plug-in.

13. A system, comprising:
   one or more processors; and
   one or more non-transitory computer readable storage media comprising instructions that, when executed by the one or more processors, causes operations to be performed comprising:
      responsive to receiving a user input to edit an image, replacing the image with an image editor specific to the image comprising a lower resolution representation of the image displayed in the image editor along with one or more editing tools;
      responsive to receiving a user input specifying an editing operation, modifying the lower resolution representation of the image displayed in the image editor according to the editing operation and displaying the modified lower resolution representation of the image in the image editor;
      causing a separate modification of the image according to the editing operation performed on the lower resolution representation of the image; and
      responsive to a user input to leave the image editor, replacing the image editor in the user interface with the modified image.

14. The system of claim 13, further comprising:
   identifying another image stored in an image library that contains the image;
   displaying the other image in the user interface;
   responsive to receiving another user input to edit the other image, replacing the other image with another instance the image editor specific to the other image the other instance of the image editor comprising a lower resolution representation of the other image displayed in the other instance of the image editor along with the one or more editing tools;
   responsive to receiving another user input specifying another editing operation, modifying the lower resolution representation of the other image displayed in the other instance of the image editor according to the other editing operation and displaying the modified lower resolution representation of the other image in the other instance of the image editor;
   causing another separate modification of the other image according to the other editing operation performed on the lower resolution representation of the other image; and responsive to another user input to leave the other instance of the image editor, replacing the other instance of the image editor in the user interface with the modified other image.

15. The system of claim 14, wherein identifying the other image is based on one or more of: GPS information associated with the image, a date of the image, and a time of the image.

16. The system of claim 14, wherein identifying the other image includes identifying at least a portion of the image and comparing the portion of the image to at least a portion of the other image.

17. The system of claim 16, wherein the portion of the image corresponds to the portion of the other image.

18. The system of claim 14, further comprising selecting, by the computing device, a low resolution version of the other image.

19. The system of claim 13, wherein the one or more editing tools include one or more of: crop, texture, rotation, stickers, sharpness, blemish, sharpen, red-eye removal, text, brightness, contrast, frames, and saturation.

20. The system of claim 13, wherein the image editor is configured in the software development kit in at least two versions, wherein a first version of the image editor is configured with a first set of editing tools, and a second version of the image editor is configured with a second set of editing tools, wherein the first set includes more editing tools than the second set.

21. The system of claim 20, further comprising tracking distribution of the respective versions of the image editor.

22. The system of claim 13, wherein the software development kit enables the image editor to be operable within mobile computing platforms, Internet web site platforms, and desktop computing platforms through different versions of the image editor.

23. The system of claim 13, wherein the image editor is integrated with the software application through one or more application programming interfaces (APIs).

24. A method, comprising:
receiving an image editor, by a computing device, to be integrated within a software application; and
integrating the image editor within the software application, by the computing device, using one of a plurality of platforms, taken from a software development kit, that corresponds to the software application, such that the image editor as part of the software application is configured to:
display a lower resolution representation of an image along with one or more editing tools within a user interface corresponding to the software application responsive to a request from a user to edit the image displayed as part of the user interface, the part of the user interface not comprising an image editor, the display replacing the image in the user interface with the image editor specific to the image;
responsive to receiving a user input specifying an editing operation, modify the lower resolution representation of the image displayed in the image editor according to the editing operation and display the modified lower resolution representation of the image in the image editor;
cause a separate modification of the image according to the editing operation performed on the lower resolution representation of the image; and
responsive to a user input to leave the image editor, receive the modified image and replace the image editor with the modified image in the user interface.

* * * * *